US012108000B1

(12) United States Patent
d'Armancourt

(10) Patent No.: US 12,108,000 B1
(45) Date of Patent: Oct. 1, 2024

(54) METHODS, APPARATUSES, AND COMPUTER PROGRAM PRODUCTS FOR CALIBRATING RADIO-FREQUENCY IDENTIFICATION (RFID) PRINTERS

(71) Applicant: Hand Held Products, Inc., Charlotte,, NC (US)

(72) Inventor: Sébastien Michel Marie Joseph d'Armancourt, Jurong West (SG)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/194,158

(22) Filed: Mar. 31, 2023

(51) Int. Cl.
*G06F 15/00* (2006.01)
*H04N 1/00* (2006.01)

(52) U.S. Cl.
CPC ..... *H04N 1/00342* (2013.01); *H04N 1/00779* (2013.01)

(58) Field of Classification Search
None
See application file for complete search history.

(56) References Cited

U.S. PATENT DOCUMENTS

| | | | |
|---|---|---|---|
| 8,258,929 B2 | 9/2012 | Wirrig et al. | |
| 10,628,723 B2* | 4/2020 | d'Armancourt | G06K 17/0025 |
| 10,956,800 B2 | 3/2021 | D'Armancourt et al. | |
| 11,303,773 B2* | 4/2022 | Alaganchetty | H04N 1/00652 |
| 2006/0109496 A1* | 5/2006 | Brown | G06K 17/0025 358/1.15 |
| 2011/0018689 A1* | 1/2011 | McAllister | B65C 9/1865 340/10.1 |
| 2015/0199594 A1* | 7/2015 | Kuniya | G06K 17/0025 358/1.5 |
| 2019/0258912 A1 | 8/2019 | Tsirline et al. | |
| 2020/0218956 A1 | 7/2020 | D'Armancourt et al. | |

FOREIGN PATENT DOCUMENTS

EP 2083378 A2 7/2009

* cited by examiner

*Primary Examiner* — Mark R Milia
(74) *Attorney, Agent, or Firm* — Alston & Bird LLP

(57) ABSTRACT

Example methods, systems, and apparatuses are provided. An example method may include setting a media feeding step parameter based on a wide feeding step value; determining whether a radio frequency identification (RFID) communication result parameter satisfies an RFID communication success threshold; in response to determining that the RFID communication result parameter satisfies the RFID communication success threshold, determining whether the RFID communication result parameter is associated with an initial RFID communication success; and in response to determining that the RFID communication result parameter is associated with the initial RFID communication success: causing retracting the print media along a media path; and updating the media feeding step parameter based on a narrow feeding step value.

20 Claims, 12 Drawing Sheets

METHODS, APPARATUSES, AND COMPUTER PROGRAM PRODUCTS FOR CALIBRATING RADIO-FREQUENCY IDENTIFICATION (RFID) PRINTERS

TECHNICAL FIELD

Example embodiments of the present disclosure generally relate to printers. For example, various embodiments of the present disclosure provide example methods, apparatuses, and computer program products that are associated with, for example but not limited to, calibrating radio-frequency identification (RFID) printers.

BACKGROUND

Applicant has identified many technical challenges and difficulties associated with printers. For example, many printers fail to determine locations and widths of communication windows associated with print media.

BRIEF SUMMARY

In general, embodiments of the present disclosure provide apparatuses, systems, methods, computer program products, and/or the like.

In accordance with some embodiments of the present disclosure, an apparatus is provided. In some embodiments, the apparatus comprises at least one processor. In some embodiments, the at least one processor is configured to set a media feeding step parameter based on a wide feeding step value; determine whether an RFID communication result parameter satisfies an RFID communication success threshold, wherein the RFID communication result parameter is associated with a print media displacement parameter that is related to print media; in response to determining that the RFID communication result parameter satisfies the RFID communication success threshold, determine whether the RFID communication result parameter is associated with an initial RFID communication success; and in response to determining that the RFID communication result parameter is associated with the initial RFID communication success: cause retracting the print media along a media path; and update the media feeding step parameter based on a narrow feeding step value.

In accordance with some embodiments of the present disclosure, a computer-implemented method is provided. In some embodiments, the computer-implemented method comprises setting a media feeding step parameter based on a wide feeding step value; determining whether an RFID communication result parameter satisfies an RFID communication success threshold, wherein the RFID communication result parameter is associated with a print media displacement parameter that is related to print media; in response to determining that the RFID communication result parameter satisfies the RFID communication success threshold, determining whether the RFID communication result parameter is associated with an initial RFID communication success; and in response to determining that the RFID communication result parameter is associated with the initial RFID communication success: causing retracting the print media along a media path; and updating the media feeding step parameter based on a narrow feeding step value.

In accordance with some embodiments of the present disclosure, a computer program product is provided. In some embodiments, the computer program product comprises at least one non-transitory computer-readable storage medium having computer-readable program code portions stored therein. In some embodiments, the computer-readable program code portions comprise an executable portion configured to: set a media feeding step parameter based on a wide feeding step value; determine whether an RFID communication result parameter satisfies an RFID communication success threshold, wherein the RFID communication result parameter is associated with a print media displacement parameter that is related to print media; in response to determining that the RFID communication result parameter satisfies the RFID communication success threshold, determine whether the RFID communication result parameter is associated with an initial RFID communication success; and in response to determining that the RFID communication result parameter is associated with the initial RFID communication success: cause retracting the print media along a media path; and update the media feeding step parameter based on a narrow feeding step value.

The foregoing illustrative summary, as well as other exemplary objectives and/or advantages of the present disclosure, and the manner in which the same are accomplished, are further explained within the following detailed description and its accompanying drawings.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

DETAILED DESCRIPTION OF THE INVENTION

Figure 1A:
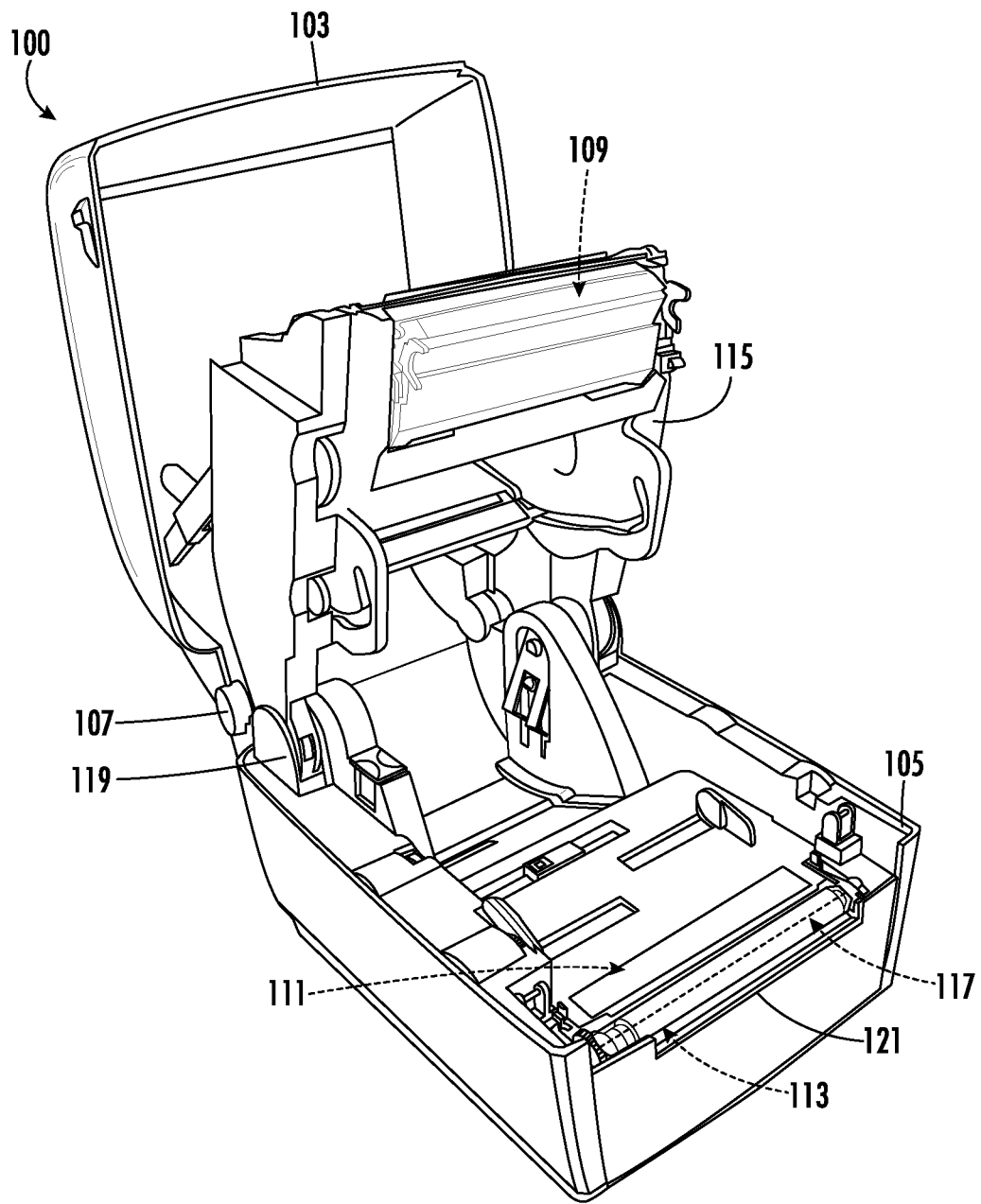
FIG. 1A illustrates an example printing apparatus in accordance with some embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and "comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, one or more particular features, structures, or characteristics from one or more embodiments may be combined in any suitable manner in one or more other embodiments.

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

In the present disclosure, the terms "electronically coupled," "electronically coupling," "electronically couple," "in communication with," "in electronic communication with," or "connected" refer to two or more components being connected (directly or indirectly) through wired means (for example, but not limited to, system bus, wired Ethernet) and/or wireless means (for example, but not limited to, Wi-Fi, Bluetooth, ZigBee, RFID), such that data and/or information may be transmitted to and/or received from these components.

In the present disclosure, the terms "printer," "printing apparatus," "RFID printer," and "RFID printing apparatus" refer to a device that encodes and/or writes and/or read data and/or information to one or more RFID tags, and/or decodes and/or reads and/or read data and/or information from one or more RFID tags. In the present disclosure, the term "RFID communication" refers to encoding and/or writing and/or reading data and/or information to one or more RFID tags, and/or decoding and/or writing and/or reading data and/or information from one or more RFID tags.

In some embodiments, an example printing apparatus in accordance with some embodiments of the present disclosure may comprise one or more RFID antennas. In some embodiments, an example RFID antenna of an example printing apparatus in accordance with some embodiments of the present disclosure may transmit radio frequency (RF) signals to one or more RFID tags.

For example, an example RFID antenna of an example printing apparatus may generate RF decoding signals (for example, in the forms of high frequency electromagnetic waves) and/or transmit RF decoding signals to one or more RFID tags. Upon receiving the RF decoding signals, the one or more RFID tags may transmit RF response signals to the example RFID antenna of the example printing apparatus. In some embodiments, the RF response signals may comprise digital data and/or information that is embedded in the one or more RFID tags. As such, the example printing apparatus may read or decode the one or more RFID tags.

Additionally, or alternatively, an example RFID antenna of an example printing apparatus may generate RF encoding signals with embedded digital data and/or information, and/or may transmit RF encoding signals to one or more RFID tags. Upon receiving the RF encoding signals, the one or more RFID tags may store digital data and/or information (for example, in one or more integrated circuit (IC) of one or more inlays of the one or more RFID tags).

While the description above provides examples of encoding and/or writing data and/or information to one or more RFID tags by an example printing apparatus, as well as examples of decoding and/or reading data and/or information from one or more RFID tags by an example printing apparatus, it is noted that the scope of the present disclosure is not limited to the description above. In some examples, an example printing apparatus may encode and/or write data and/or information to one or more RFID tags in other ways, and/or decode and/or read data and/or information from one or more RFID tags in other ways.

In some embodiments, an example printing apparatus may imprint texts, images, shapes, symbols, graphics, and/or the like onto print media to create a persistent, human-viewable representation of the corresponding texts, images, shapes, symbols, graphics, and/or the like. For example, an example printing apparatus in accordance with various embodiments of the present disclosure may print machine-readable indicium (such as, but not limited to, barcodes, OCR-characters, QR codes, text, illustrations, etc.) onto print media.

In the present disclosure, the terms "print media," "physical print media," "paper," and "labels" refer to tangible, substantially durable physical material onto which text, graphics, images and/or the like may be imprinted and persistently retained over time. In some embodiments, print media may generally be derivative of wood pulp or polymers. Examples of print media include, but are not limited to, office paper, clear or tinted acetate media, newsprint, envelopes, mailing labels, product labels, other kinds of labels, cardstock, cardboard, and/or the like. In some embodiments, print media may be used to receive ink, dye, or toner, or may be a media whose color or shading can be selectively varied (for example, through selective application of heat, light, or chemicals) to create a persistent visual contrast (in black and white, shades of gray, and/or colors) that can be perceived by the human eye as texts, images, shapes, symbols, or graphics. In some embodiments, print media may be continuous. In some embodiments, print media may be non-continuous. In some embodiments, print media may be used for personal communications, business communications, and/or the like to convey prose expression (including news, editorials, product data, academic writings, memos, and many other kinds of communications), data, advertising, fiction, entertainment content, illustrations and pictures, and/or the like.

In the present disclosure, the terms "indicium," "indicia," "machine-readable indicium," "machine-readable indicia," "barcode" and "OCR-B character" refer to an optical representation of digital data and/or information (e.g., data and/or information is encoded into the barcode and OCR-B character) that may be scanned (i.e., machine read) by a scanning apparatus (e.g. a barcode scanner, a machine-reader, etc.). In some embodiments, many types of barcodes and OCR-B characters may be implemented in accordance with some embodiments of the present disclosure. In some embodiments, barcodes may be one-dimensional barcodes (e.g., Universal Product Code, or "U.P.C.") having dark lines (i.e., bars) and light lines (i.e., spaces) of various widths arranged along a scan axis. In some embodiments, barcodes may be two-dimensional matrix symbols (e.g., Aztec Code, Data Matrix, QR Code, PDF417, etc.) (also referred to as a "two-dimensional barcode") having a two-dimensional array of light features, dark features, and, in some embodiments, alignment features. In some embodiments, the light and dark features may include "modules," i.e., the printed (or unprinted) squares in a two-dimensional matrix symbol. In some embodiments, the graphical look of a two-dimensional barcode may be created by different patterns of geometric shapes. In some embodiments, barcodes may use color (e.g., Ultracode) to encode data. In some embodiments, OCR-B characters also encode data and include "modules" (i.e., printed or unprinted squares).

In some embodiments, indicia such as barcodes and OCR-B characters are printed on print media. Once printed on the print media, an indicium is referred to herein as a "printed indicium." For example, once printed on the print media, the barcode is referred to herein as a "printed barcode." Similarly, the OCR-B character is referred to herein as a "printed OCR-B character" once printed on the print media. In some embodiments, the print media on which the machine-readable indicium is printed may also be referred to herein as a "printed medium" or "printed media." In some embodiments, the printed medium may be affixed to an object or an item. For example, the encoded data of the printed barcode may relate to item(s) on which the printed medium is affixed. In some embodiments, the terms "barcode" and "symbol" may be used interchangeably herein. In some embodiments, the tolerance of the machine-readable indicium is closely related to the scanning apparatus' ability to read the printed indicium (e.g., a printed barcode) in a single scan, and to correctly interpret the encoded data.

In some embodiments, example print media may comprise one or more RFID tags. In some embodiments, an example RFID tag comprises an RFID inlay that includes an IC and an antenna that are disposed on a substrate. In some embodiments, the IC may include a memory circuitry that stores digital data (such as, but not limited to, an electronic product code (EPC), a unique tag identification (ID) number, and/or the like).

In some embodiments, one or more RFID tags are secured onto one or more surfaces of print media through the use of chemical adhesives (such as, but not limited to, glues). Additionally, or alternatively, one or more example RFID tags are embedded into example print media. Additionally, or alternatively, one or more example RFID tags are incorporated into example print media through one or more other ways.

Figure 1B:
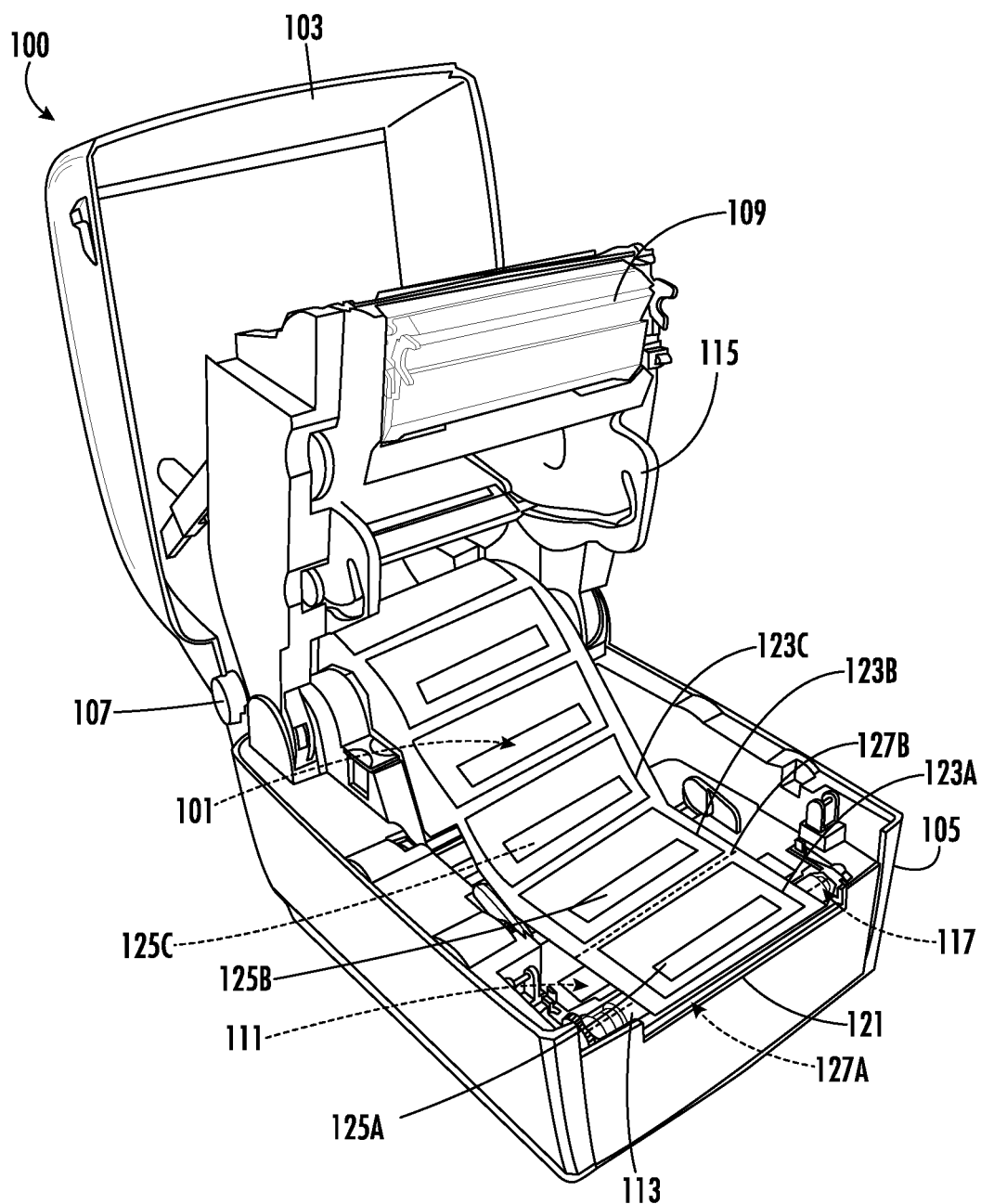
FIG. 1B illustrates example print media at an example resting print media location within the example printing apparatus shown in FIG. 1A in accordance with some embodiments of the present disclosure.
Figure 1C:
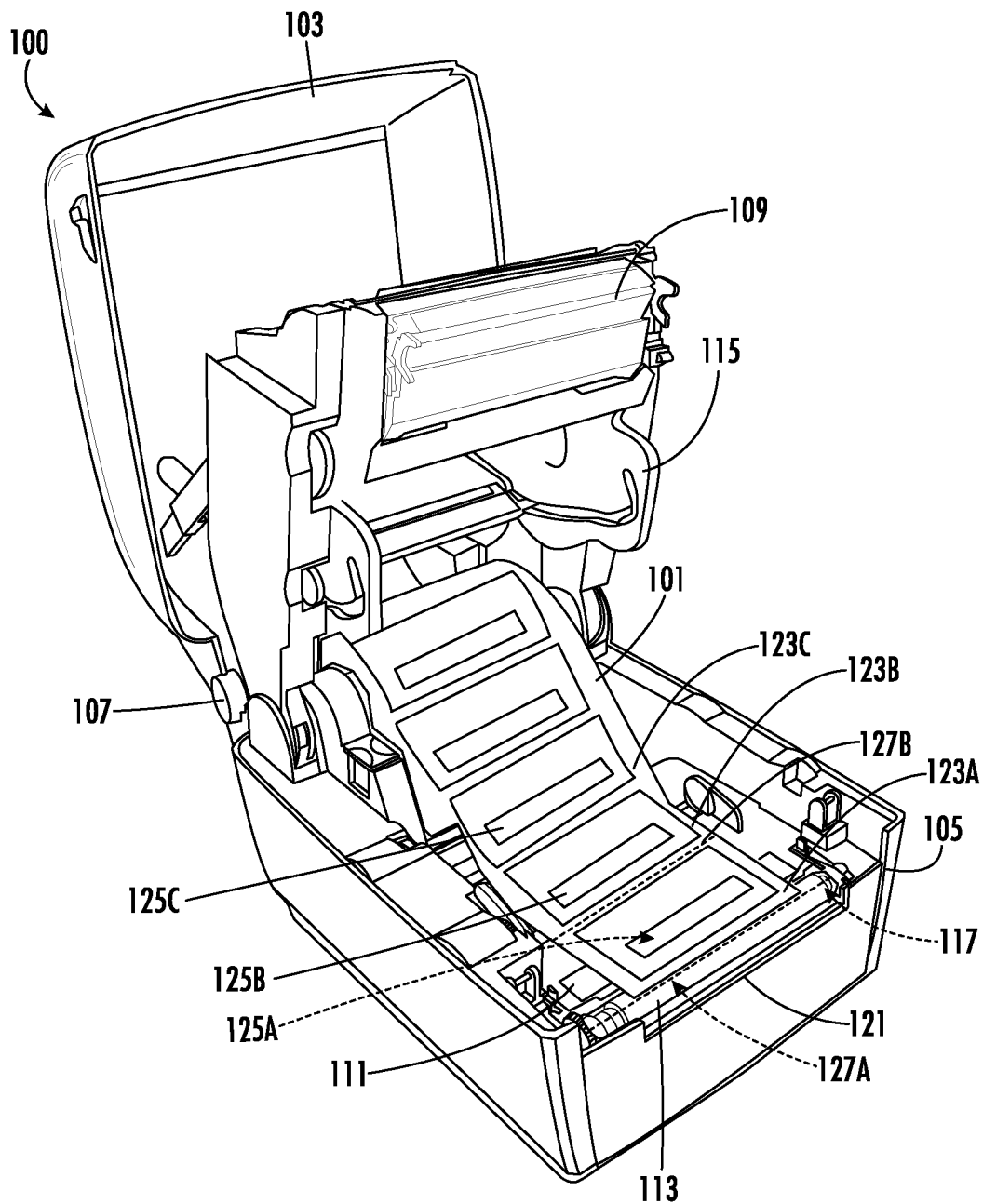
FIG. 1C illustrates example print media at an example initialized print media location within the example printing apparatus shown in FIG. 1A in accordance with some embodiments of the present disclosure.

Referring now to FIG. 1A, FIG. 1B, and FIG. 1C, an example printing apparatus 100 in accordance with some embodiments of the present disclosure is illustrated. For example, FIG. 1A provides an example view of the example printing apparatus 100 when the example printing apparatus 100 is an open configuration. FIG. 1B and FIG. 1C provide example views of example locations associated with the example print media 101 in the example printing apparatus 100.

In the example shown in FIG. 1A, the example printing apparatus 100 comprises a printer cover 103 and a printer base 105. In some embodiments, the printer cover 103 is connected to the printer base 105 through one or more rotatable joints 107. For example, one or more portions of the one or more rotatable joints 107 may be secured to one or more portions (for example, but not limited to, an edge, a corner, and/or the like) of the printer cover 103, and one or more other portions of the one or more rotatable joints 107 may be secured to one or more portions (for example, but not limited to, an edge, a corner, and/or the like) of the printer base 105. In some embodiments, the one or more rotatable joints 107 are configured to allow the printer cover 103 to rotate, swing, and/or pivot from the printer base 105. Examples of rotatable joints 107 in accordance with some embodiments of the present disclosure may include, but not are limited to, hinges, swivels joints, pivot joints and/or the like.

In some embodiments, an example printing apparatus may be in a closed configuration. For example, the printer cover 103 may be rotated to cover the printer base 105 through the one or more rotatable joints 107. In some embodiments, when an example printing apparatus is in a closed configuration, the printer cover 103 and the printer base 105 may form an enclosure that provides a housing for components disposed within the printing apparatus 100.

In some embodiments, the example printing apparatus 100 may be in an open configuration. For example, the printer cover 103 may be rotated away from the printer base 105 through the one or more rotatable joints 107. In some embodiments, when the example printing apparatus 100 is in an open configuration, components disposed within the example printing apparatus 100 are exposed. In the examples illustrated in FIG. 1A, FIG. 1B, and FIG. 1C, the example printing apparatus 100 is in an example open configuration.

Referring now to FIG. 1A, example components of the example printing apparatus 100 include, but not limited to, a printhead 109, an RFID antenna 111, and a platen roller 113.

In some embodiments, the printhead 109 is in the form of a thermal printhead. For example, the printhead 109 may comprise one or more heating elements. In some embodiments, the printhead 109 heats up when the heating elements receive electricity. In some embodiments, the printing apparatus 100 may be in the form of a direct thermal printer. In such an example, the printhead 109 uses heat to create one or more indicia directly on print media (such as, but not limited to, heat-sensitive papers). In some embodiments, the printing apparatus 100 may be in the form of a thermal transfer printer. In such an example, the printhead 109 transfers heat to an ink ribbon that is pressed on the print media to create one or more indicia.

While the description above provides an example printhead in the form of a thermal printhead, it is noted that the scope of the present disclosure is not limited to the description above. In some examples, an example printhead in accordance with some embodiments of the present disclosure may be in the form of, such as, but not limited to, a laser printhead.

In some embodiments, the printhead 109 is secured to a printhead base 115. In some embodiments, the printhead base 115 is connected to the printer base 105 through one or more rotatable joints 119. For example, one or more portions of the one or more rotatable joints 119 may be secured to one or more portions (for example, but not limited to, an edge, a corner, and/or the like) of the printhead base 115 and one or more other portions of the one or more rotatable joints 119 may be secured to one or more portions (for example, but not limited to, an edge, a corner, and/or the like) of the printer base 105. In some embodiments, the one or more rotatable joints 119 are configured to allow the printhead base 115 to rotate, swing, and/or pivot from the printer base 105. Examples of rotatable joints 119 in accordance with some embodiments of the present disclosure may include, but not limited to, hinges, swivels joints, pivot joints and/or the like.

In some embodiments, the printhead base 115 is positioned with the printer cover 103 when the printing apparatus 100 is in the closed configuration. For example, when the printing apparatus 100 is in the closed configuration, the printer cover 103 and the printer base 105 form an enclosure that provides a housing for the printhead base 115 (including the printhead 109).

While the example shown in FIG. 1A provides an example printhead being positioned on an edge of the printhead base, it is noted that the scope of the present disclosure is not limited to this example. In some embodiments, one or more example printheads may additionally or alternatively be positioned in other portion(s) of the printing apparatus 100.

In some embodiments, the platen roller 113 is in the form of a cylindrical roller that is secured to the printer base 105. In some embodiments, the platen roller 113 is configured to feed and/or hold print media during printing operation. For example, the platen roller 113 may rotate and cause the print media to travel along a media path in a print media feeding direction (also referring to as "feeding" the print media). Additionally, or alternatively, the platen roller 113 may rotate and cause the print media to travel along the media path in a print media retracting direction (also referred to as "retracting" the print media).

In some embodiments, the print media feeding direction is opposite to the print media retracting direction. In some embodiments, changing the rotation direction of the platen roller 113 may cause the print media to switch between feeding and retracting along the media path.

In some embodiments, the platen roller 113 is positioned adjacent to a tear bar 121 of the printing apparatus 100. In some embodiments, the tear bar 121 comprises a metal or plastic bar that is located near the end of the media path. In some embodiments, the tear bar 121 may perforate the print media when the print media passes through the tear bar 121 and/or exits the printing apparatus 100.

In some embodiments, when the printing apparatus 100 is in the closed configuration, the printhead 109 is positioned adjacent to the platen roller 113 such that the printhead 109 and the platen roller 113 create an open gap or passageway where print media may travel through. In some embodiments, the gap or passageway between the printhead 109 and the platen roller 113 is a part of the media path. For example, when the print media is at the open passageway, the print media may be pinched between the printhead 109 and the platen roller 113 such that the printhead 109 may create one or more indicia on the print media (for example, based on various example mechanisms described above). In the example shown in FIG. 1A, the burn line 117 illustrates an example location where the printhead 109 may be pinched again the printer media to create indicia.

In some embodiments, the RFID antenna 111 is secured to the printer base 105. For example, the RFID antenna 111 is positioned upstream from the platen roller 113 in the print media feeding direction of the media path, example details of which are described in connection with at least FIG. 2A and FIG. 2B.

In some embodiments, the RFID antenna 111 comprises one or more components (such as but not limited to, conductive elements) for transmitting and/or receiving RF signals. For example, when an RFID tag of the print media is brought into the proximity of the RFID antenna 111 (for example, by the platen roller 113), the RFID antenna 111 may encode or writer digital data and/or information to the RFID tag, and/or may decode or read digital data and/or information from the RFID tag.

Referring now to FIG. 1B and FIG. 1C, example diagrams illustrating example locations of the print media 101 within the printing apparatus 100 in accordance with some embodiments of the present disclosure are provided.

As described above, the print media 101 in accordance with some embodiments of the present disclosure may be non-continuous. In the examples shown in FIG. 1B and FIG. 1C, the print media 101 may be divided into a plurality of labels (including, but not limited to, a label 123A, a label 123B, and a label 123C) through perforations that are defined along a width of the print media 101. Additionally, or alternatively, the print media 101 may be divided into the plurality of labels (including, but not limited to, the label 123A, the label 123B, and the label 123C) by one or more marks that are at a defined distance from each other along a length of the print media 101. Additionally, or alternatively, the plurality of labels may be defined through other means.

In some embodiments, a contiguous stretch of the print media 101 between two consecutive marks or two consecutive perforations corresponds to a label of a plurality of labels (including, but not limited to, the label 123A, the label 123B, and the label 123C). In some embodiments, each of the plurality of labels comprise edges. In some embodiments, the edges of a label separate the label from the adjacent labels in the print media. For example, the perforations and/or the marks described above define the edges of the labels.

In some embodiments, each of the plurality of labels comprises two label edges such as, but not limited to, a leading label edge and a trailing label edge. In some embodiments, a label edge of the two label edges positioned towards the print media feeding direction is referred to as a leading label edge of the label, and the other label edge of the two label edges is referred to as a trailing label edge of the label. In some embodiments, the trailing label edge is positioned upstream of the leading label edge with respect to the print media feeding direction along the media path. In the example shown in FIG. 1B and FIG. 1C, the label 123A comprises a leading label edge 127A and a trailing label edge 127B.

In some embodiments, each of the plurality of labels (including, but not limited to, the label 123A, the label 123B, and the label 123C) includes a printable portion on which indicia may be printed by the printhead 109. In some implementations, the printable portion on a label may correspond to the complete label. In such examples, indicia may be printed anywhere on the complete label. Additionally, or alternatively, an area of the printable portion is less than the area of the label.

While the description above describe example print media in the form of non-continuous print media, it is noted that the scope of the present disclosure is not limited to the description above. In some embodiments, an example print media may additionally, or alternatively, comprise continuous media that is not divided into labels.

In the examples shown in FIG. 1B and FIG. 1C, the print media 101 comprises one or more RFID tags (such as, but not limited to, an RFID tag 125A, an RFID tag 125B, an RFID tag 125C, and/or the like). In some embodiments, only one RFID tag is disposed on each of the plurality of labels of the print media 101. For example, the RFID tag 125A is disposed on the label 123A, the RFID tag 125B is disposed on the label 123B, and the RFID tag 125C is disposed on the label 123C. Additionally, or alternatively, more than one RFID tag is disposed on one or more of the plurality of labels of the print media 101.

As described above, the RFID antenna 111 may encode or writer digital data and/or information to the plurality of RFID tags, and/or may decode or read digital data and/or information from the plurality of RFID tags. In some embodiments, the platen roller 113 may rotate and cause the print media 101 to travel such that an RFID tag of the print media 101 is align with the RFID antenna 111 for programming/communicating with the RFID tag.

In some embodiments, a width of the RFID antenna 111 is the same or more than a width of the RFID tag of the print media 101. In some examples, the RFID antenna 111 may cover the entire width of the RFID tag, providing technical benefits and advantages such as, but not limited to, improved communication accuracy. In some embodiments, a width of the RFID antenna 111 is less than the width of the RFID tag, providing technical benefits and advantages such as, but not limited to, reduced power consumption.

FIG. 1B illustrates an example print media resting location of the print media 101 within the printing apparatus 100. In some embodiments, when the print media 101 is at the print media resting location, a leading label edge of a label of the print media 101 (for example, the leading label edge 127A of the label 123A) is aligned with the tear bar 121.

Comparing the location of the print media 101 shown in FIG. 1B with the location of the print media 101 shown in FIG. 1C, the print media 101 shown in FIG. 1C has been retracted by a maximum retraction distance from the print media resting location shown in FIG. 1B. In the example shown in FIG. 1C, after the print media 101 has been retracted by the maximum retraction distance, a leading label edge of the first label of the print media 101 (for example, the leading label edge 127A of the label 123A) is aligned with the burn line 117 of the printing apparatus 100. In some embodiments, the "maximum retraction distance" refers to a distance between the tear bar 121 and the burn line 117 of the printing apparatus. In some embodiments, if the print media 101 is retracted from the example print media resting location shown in FIG. 1B by a distance that is more than the maximum retraction distance, the print media 101 cannot be pinched between the platen roller 113 and the printhead 109, making it difficult (if not impossible) to feed or retract the print media 101.

In some embodiments, the example location of the print media 101 shown in FIG. 1C is referring to as an initialized print media location. For example, when the printing apparatus 100 initializes an example RFID printer calibration algorithm in accordance with some embodiments of the present disclosure, the print media 101 is retracted by the maximum retraction distance to the initialized print media location shown in FIG. 1C, such that a leading label edge of a label of the print media is aligned with the burn line 117 of the printing apparatus 100. Additional details associated with example RFID printer calibration algorithms are described herein, including, but not limited to, those described in connection with at least FIG. 2A to FIG. 7D.

Figure 2A:
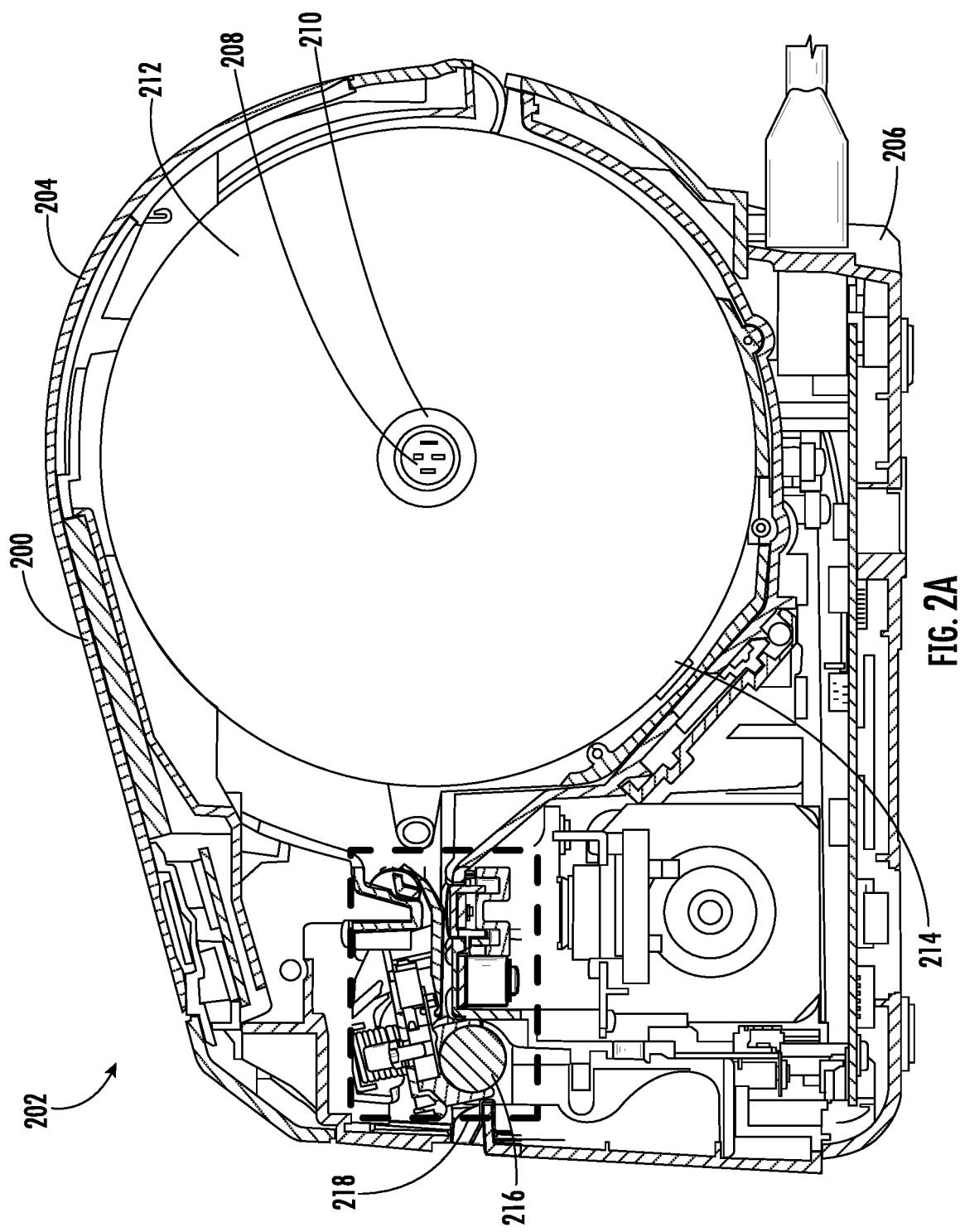
FIG. 2A illustrates an example cross-section view of an example printing apparatus in accordance with some embodiments of the present disclosure.
Figure 2B:
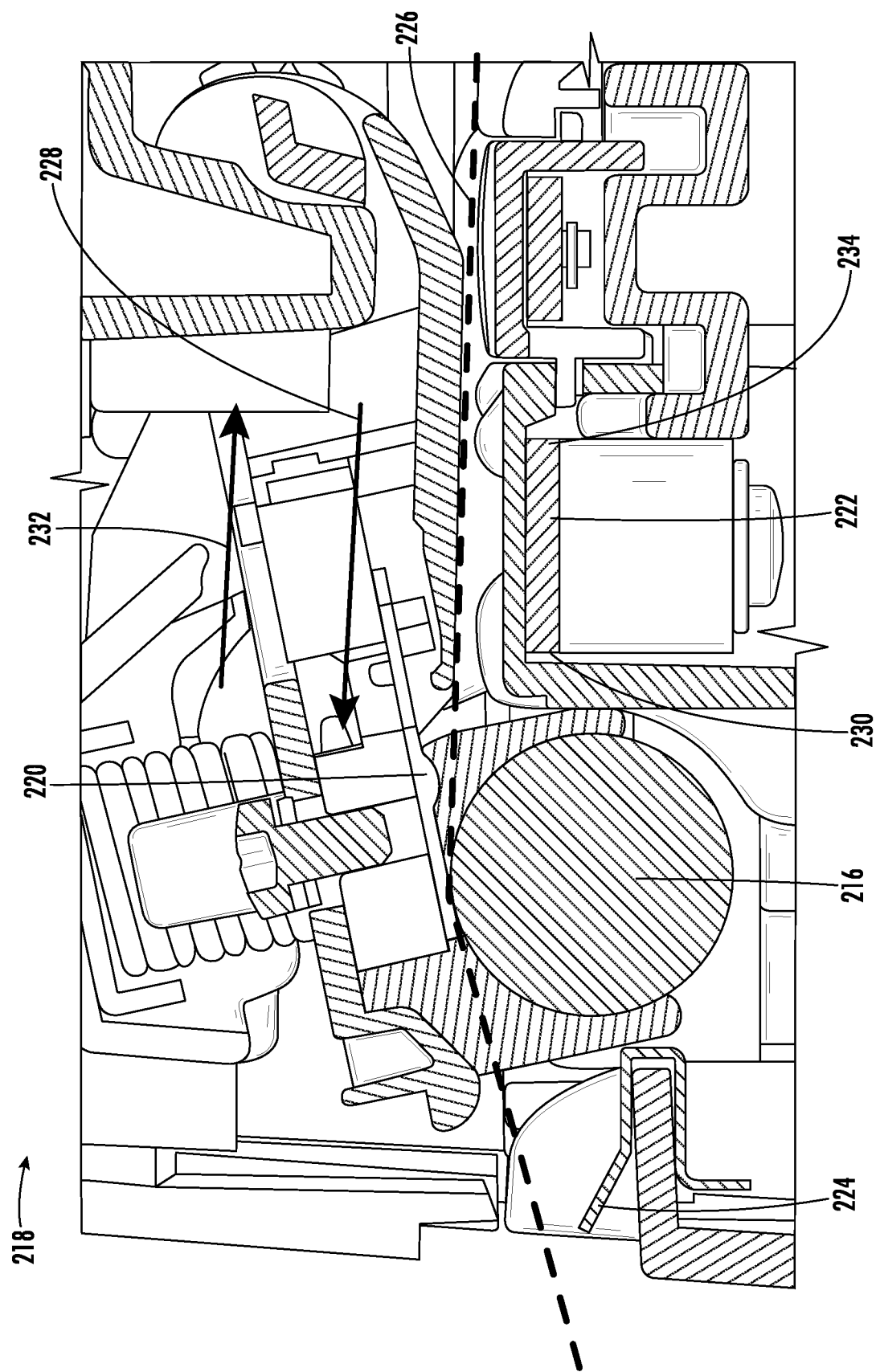
FIG. 2B illustrates an example zoomed view of an example portion of the example printing apparatus shown in FIG. 2A in accordance with some embodiments of the present disclosure.

Referring now to FIG. 2A and FIG. 2B, example views associated with an example printing apparatus 200 in accordance with some embodiments of the present disclosure are illustrated.

FIG. 2A illustrates an example cross-section view 202 of the example printing apparatus 200. For example, the example cross-section view 202 may be produced by cutting the example printing apparatus 200 along a vertical plane that is aligned with a longitudinal axis of the example printing apparatus 200.

In the example shown in FIG. 2A, the example printing apparatus 200 comprises a printer cover 204 and a printer base 206, similar to the example printer cover 103 and the printer base 105, respectively, described above in connection with FIG. 1A to FIG. 1C.

In some embodiments, the example printing apparatus 200 comprises a media supply spindle 208. In some embodiments, the media supply spindle 208 passes through a media supply spool 210, and the media supply spool 210 is secured on the media supply spindle 208. In some embodiments, a print media roll 212 comprising print media 214 wound on the media supply spool 210.

In some embodiments, the example printing apparatus 200 comprises one or more motors. For example, the example printing apparatus 200 may comprise one or more motors for rotating the media supply spindle 208 in a clockwise direction and/or a counterclockwise direction. Additionally, or alternatively, the example printing apparatus 200 may comprise one or more motors for rotating the platen roller 216 in a clockwise direction and/or a counterclockwise direction.

FIG. 2B illustrates an example zoomed view of an example portion 218 of the example printing apparatus 200 shown in FIG. 2A. In particular, FIG. 2B illustrates example components of the printing apparatus 200 that include, but are not limited to, a printhead 220, an RFID antenna 222, a platen roller 216, and a tear bar 224, which are similar to the printhead 109, the RFID antenna 111, the platen roller 113, and the tear bar 121, respectively, described above in connection with FIG. 1A to FIG. 1C.

Similar to those examples described above, the printhead 220 and the RFID antenna 222 create an open gap or passageway that is a part of a media path 226. In the present disclosure, the term "media path" refers to a path, a route, or a trail where the print media (such as, but not limited to, labels, RFID tags, and/or the like) travels within the printing apparatus 200.

In some embodiments, the print media may travel along the media path 226 in a print media feeding direction 228 shown in FIG. 2B. For example, the one or more motors of the example printing apparatus 200 may cause the print media to travel from the media supply spindle 208 towards the platen roller 216 (and/or the printhead 220) in the print media feeding direction 228.

In some embodiments, the print media may travel along the media path 226 in a print media retracting direction 232 as shown in FIG. 2B. For example, the one or more motors of the example printing apparatus 200 may cause the print media to travel from the platen roller 216 (and/or the printhead 220) towards the media supply spindle 208 in the print media retracting direction 232.

In the example shown in FIG. 2B, both the print media feeding direction 228 and the print media retracting direction 232 are directions along the media path 226. In some embodiments, the print media feeding direction 228 is opposite to the print media retracting direction 232.

Similar to those described above, the RFID antenna 222 is positioned upstream of the platen roller 216 (and/or the printhead 220) in the print media feeding direction 228 along the media path 226. For example, when the print media travels in the print media feeding direction 228, the print media travels from the RFID antenna 222 to the platen roller 216 (and/or the printhead 220) along the media path 226. When the print media travels in the print media retracting direction 232, the print media travels from the platen roller 216 (and/or the printhead 220) to the RFID antenna 222 along the media path 226.

While FIG. 2A and FIG. 2B illustrate an example arrangement of the RFID antenna being placed upstream of the platen roller (and/or the printhead) in the print media feeding direction 228 along the media path 226, it is noted that the scope of the present disclosure is not limited to the description above. In some examples, the RFID antenna 222 may be placed downstream of the platen roller 216 (and/or the printhead 220) in the print media feeding direction 228 along the media path 226.

In some embodiments, the RFID antenna 222 comprises a leading RFID antenna edge 230 and a trailing RFID antenna edge 234. In some embodiments, an RFID antenna edge positioned towards the print media feeding direction is referred to as a leading RFID antenna edge, and the other RFID antenna edge of the RFID antenna is referred to as trailing RFID antenna edge. For example, the leading RFID antenna edge 230 may be positioned towards the print media feeding direction, and the trailing RFID antenna edge 234 may be positioned towards print media retracting direction. In some embodiments, the trailing RFID antenna edge 234 is positioned upstream of the leading RFID antenna edge 230 with respect to the print media feeding direction along the media path.

Figure 3:
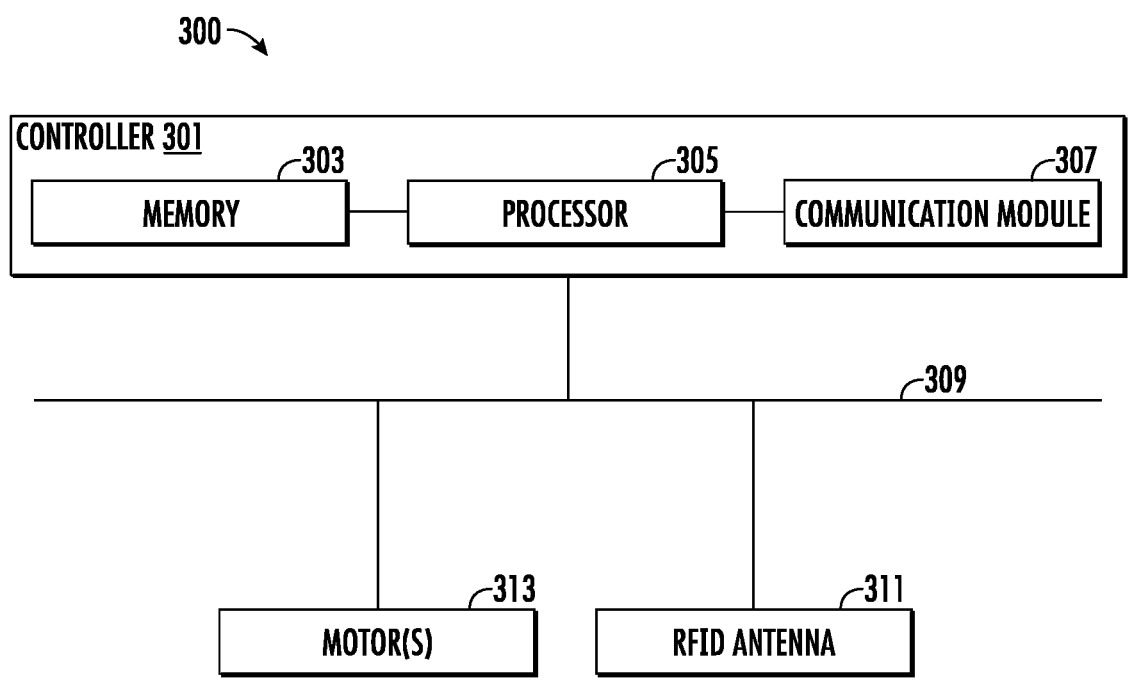
FIG. 3 illustrates an example block diagram of example components associated with an example printing apparatus in accordance with some embodiments of the present disclosure.

Referring now to FIG. 3, an example block diagram illustrating some example components of the printing apparatus 300 is provided. In some embodiments, the printing apparatus 300 may comprise a controller 301 that is communicatively coupled to one or more motor(s) 313 and the RFID antenna 311.

In some embodiments, the controller 301 comprises a processor 305, a memory 303 communicatively coupled to the processor 305, and a communication module 307 communicatively coupled to the processor 305.

In some embodiments, the processor 305 may be embodied in a number of different ways. For example, the processor 305 may be embodied as one or more complex programmable logic devices (CPLDs), microprocessors, multi-core processors, coprocessing entities, application-specific instruction-set processors (ASIPs), microcontrollers, and/or controllers. Additionally, or alternatively, the processor 305 may be embodied as one or more other processing devices or circuitry. In the present disclosure, the term "circuitry" may refer to an entirely hardware embodiment or a combination of hardware and computer program products. Thus, the processor 305 may be embodied as integrated circuits, application specific integrated circuits (ASICs), field programmable gate arrays (FPGAs), programmable logic arrays (PLAs), hardware accelerators, other circuitry, and/or the like. In some embodiments, the processor 305 may be configured for a particular use or configured to execute instructions stored in volatile or non-volatile media or otherwise accessible to the processor 305. As such, whether configured by hardware or computer program products, or by a combination thereof, the processor 305 may be capable of performing steps or operations according to embodiments of the present disclosure when configured accordingly.

In some embodiments, the memory 303 may include, but not limited to, non-volatile media (also referred to as non-volatile storage, memory, memory storage, memory circuitry and/or similar terms used herein interchangeably). In some embodiments, the non-volatile storage or memory may include, but not limited to, hard disks, read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like. In some embodiments, the memory 303 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

Additionally, or alternatively, the memory 303 may include, but not limited to, volatile media (also referred to as volatile storage, memory, memory storage, memory circuitry and/or similar terms used herein interchangeably). In some embodiments, the volatile storage or memory may include, but not limited to, random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. In some embodiments, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor 305. Thus, the databases, database instances, database management systems, data, applications, programs, program modules, scripts, source code, object code, byte code, compiled code, interpreted code, machine code, executable instructions, and/or the like may be used to control certain aspects of the operation of the processor 305.

In some embodiments, the communication module 307 includes one or more network interfaces for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the controller 301 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

In some embodiments, the controller 301 may generate and/or transmit control instructions to the one or more motor(s) 313 and/or the RFID antenna 311 via the system bus 309. In some embodiments, the controller 301 or the processor 305 generates control instructions based at least in part on executing one or more RFID printer calibration algorithms, details of which are described herein.

For example, the controller may transmit control instructions to the one or more motor(s) 313 to cause the platen roller and/or the media supply spindle to rotate so that the print media feeds in the print media feeding direction along the media path. Additionally, or alternatively, the controller 301 may transmit control instructions to the one or more motor(s) 313 to cause the platen roller and/or the media supply spindle to rotate so that the print media retracts in the print media retracting direction along the media path. Additionally, or alternatively, the controller 301 may transmit control instructions to the RFID antenna 311 so that the RFID antenna 311 initializes RFID communications with the print media (for example, encoding and/or writing data and/or information to a RFID tag of the print media, decoding and/or reading data and/or information from the RFID tag of the print media, and/or the like), details of which are described herein.

Figure 4A:
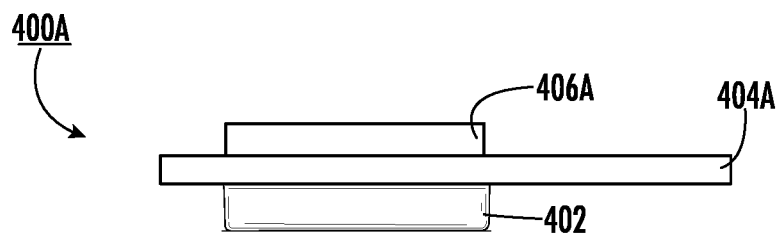
FIG. 4A, FIG. 4B, and FIG. 4C provide example diagrams illustrating example arrangements of example print media relative to an example RFID antenna and in accordance with some embodiments of the present disclosure.
Figure 4B:
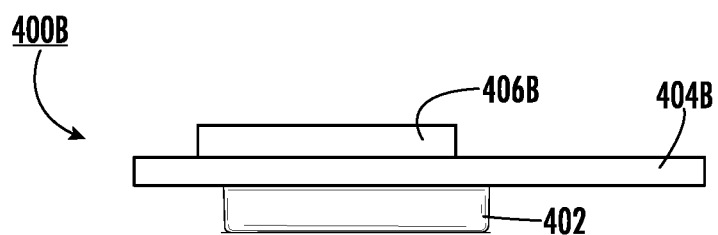
Figure 4C:
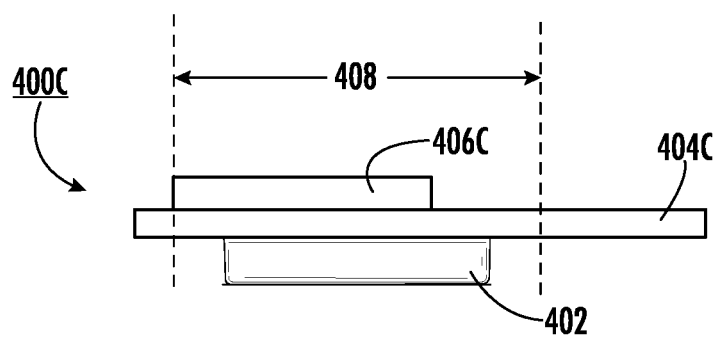

Referring now to FIG. 4A, FIG. 4B, and FIG. 4C, example arrangements of example print media relative to an example RFID antenna 402 are illustrated. In some embodiments, the example RFID antenna 402 is a part of a printing apparatus, similar to those examples described above. For example, the example RFID antenna 402 may comprise one or more components (such as but not limited to, conductive elements) for transmitting RF signals to and/or receiving RF signals from one or more RFID tags.

In the example arrangement 400A shown in FIG. 4A, the print media comprises a label 404A and an RFID tag 406A. In some embodiments, the RFID tag 406A is disposed on a top surface of the label 404A.

In the example arrangement 400A shown in FIG. 4A, the RFID tag 406A is aligned with the example RFID antenna 402. For example, a central axis of the RFID tag 406A overlaps with a central axis of the example RFID antenna 402. Similar to those examples described above, a width of the example RFID antenna 402 may be the same as a width of the RFID tag 406A. In such examples, the example arrangement 400A of the example print media relative to the example RFID antenna 402 allows the example RFID antenna 402 to establish RFID communications with the RFID tag 406A (for example, encoding and/or writing data and/or information to the RFID tag 406A, and/or decoding and/or reading data and/or information from the RFID tag 406A).

In some embodiments, a processor of the printing apparatus may transmit one or more control instructions to one or more motors of the printing apparatus so as to cause the print media to travel along the media path to achieve the example arrangement 400A shown in FIG. 4A. However, various factors (such as, but not limited to, variability in parts and/or media and/or components that arises from manufacturing processes, material properties, and/or the like) may cause the actual arrangement of the print media (relative to the example RFID antenna 402) to deviate from the example arrangement 400A shown in FIG. 4A.

For example, due to variations in printer registration, the actual location of the print media (including, for example, a RFID tag of the print media) relative to the RFID antenna may be misaligned from the location specified by the control instructions from the processor.

As an example, a controller of a printing apparatus may transmit control instructions to the one or more motors of the printing apparatus to cause feeding the print media along the media path, and the control instructions may specify a destination location of the label and/or the RFID tag for aligning the RFID tag with the RFID antenna as shown in FIG. 4A. However, variations in printer registration may cause the actual location of the label to differ from the destination location specified by the transmit control instructions, resulting in an example arrangement 400B shown in FIG. 4B where the label 404B (and the RFID tag 406B) are fed further by one millimeter such that the RFID tag 406B is misaligned from the RFID antenna 402 (as compared to the example shown in FIG. 4A).

In some embodiments, variations in printer registration may cause the print media to be misaligned from the destination location that is specified by the control instructions within plus-minus one millimeter along the media path. In such examples, the print media (including labels and RFID tags of the print media) may be inadvertently fed or retracted by up to one millimeter further from the destination location specified by the control instructions.

Additionally, or alternatively, due to variations in print media manufacturing, the actual location of an RFID tag on a label may differ from the destination location specified by the manufacturing specification for the print media.

In some embodiments, variations in manufacturing the print media may cause the RFID tag to be misaligned from the destination location on the label within plus-minus one millimeter. In such examples, the actual location of the RFID tag may be up to one millimeter away from the destination location of the RFID tag (either ahead of the destination location or behind the destination location).

In some embodiments, variations in printer registration, compounded by variations in print media manufacturing, may cause the RFID tag to be significantly misaligned from the RFID antenna. As an example, a controller of a printing apparatus may transmit control instructions to the one or more motors of the printing apparatus to cause feeding the print media along the media path, and the control instructions may specify a destination location of the RFID tag and/or the label for aligning the RFID tag with the RFID antenna as shown in FIG. 4A. However, variations in printer registration and print media manufacturing may cause the actual location of the label to differ from the destination location as specified by the control instructions, resulting in an example arrangement 400C shown in FIG. 4C, where not only the RFID tag 406C is located further by one millimeter on the label 404C due to variations in print media manufacturing, but also the label 404C is fed further by one millimeter in the print media feeding direction due to variations in printer registration. In the example shown in FIG. 4C, a central axis of the RFID tag 406C is two millimeters ahead of from the central axis of the RFID antenna 402 in the print media feeding direction.

In the present disclosure, the term "RFID tag deviation range" refers to an amount or a range of deviations between an actual location of an RFID tag (relative to an RFID antenna) and a destination location of the RFID tag (relative to an RFID antenna) as specified by the control instructions from the controller. In some embodiments, variations in printer registration and print media manufacturing may cause the actual location of RFID tag to be misaligned within plus-minus two millimeters from the destination location of the RFID tag in the print media feeding direction, resulting a maximum RFID tag deviation range 408 of four millimeters.

While the description above provides example values associated with variations and RFID tag deviation range, it is noted that the scope of the present disclosure is not limited to the examples above. In some examples, example variations and/or RFID tag deviation ranges may be less than or more than these example values described above.

Variability in parts and/or components (such as, but not limited to, variations in printer registration and/or variations in manufacturing print media) may cause many technical challenges and difficulties. As an example, because the actual location of RFID tag can be misaligned from the destination location of the RFID tag specified by the control instructions from the printing apparatus, the printing apparatus may not be able to establish RFID communications with the RFID tag for writing data to and/or reading data from the RFID tag. For example, the higher the RFID tag deviation range, the further away the RFID tag may be located from the RFID antenna, and the less effective and accurate that the RFID antenna can communicate with the RFID tag.

To address such example technical challenges and difficulties, an example printing apparatus (including a controller/processor of the example printing apparatus) may execute one or more RFID printer calibration algorithms to determine one or more RFID communication window parameters associated with the print media. In the present disclosure, the term "RFID communication window parameter" refers to a parameter, an attribute, an indicator and/or the like that comprises, represents, and/or indicates one or more RFID communication windows associated with the print media. In the present disclosure, the term "RFID communication window" refers to one or more regions, areas, ranges and/or spans related to and/or associated with the print media where an RFID antenna may establish RFID communications, and the success rates of the RFID communications satisfy a success threshold.

As described above, the print media may comprise a plurality of labels and a plurality of RFID tags, and each of the plurality of RFID tags is disposed on one of the plurality of labels. In such an example, the RFID communication window parameter may indicate one or more regions, areas, ranges and/or spans that are related to one or more of the plurality of labels where an RFID antenna may establish RFID communications, and the success rates of the RFID communications satisfy a success threshold.

Figure 5:
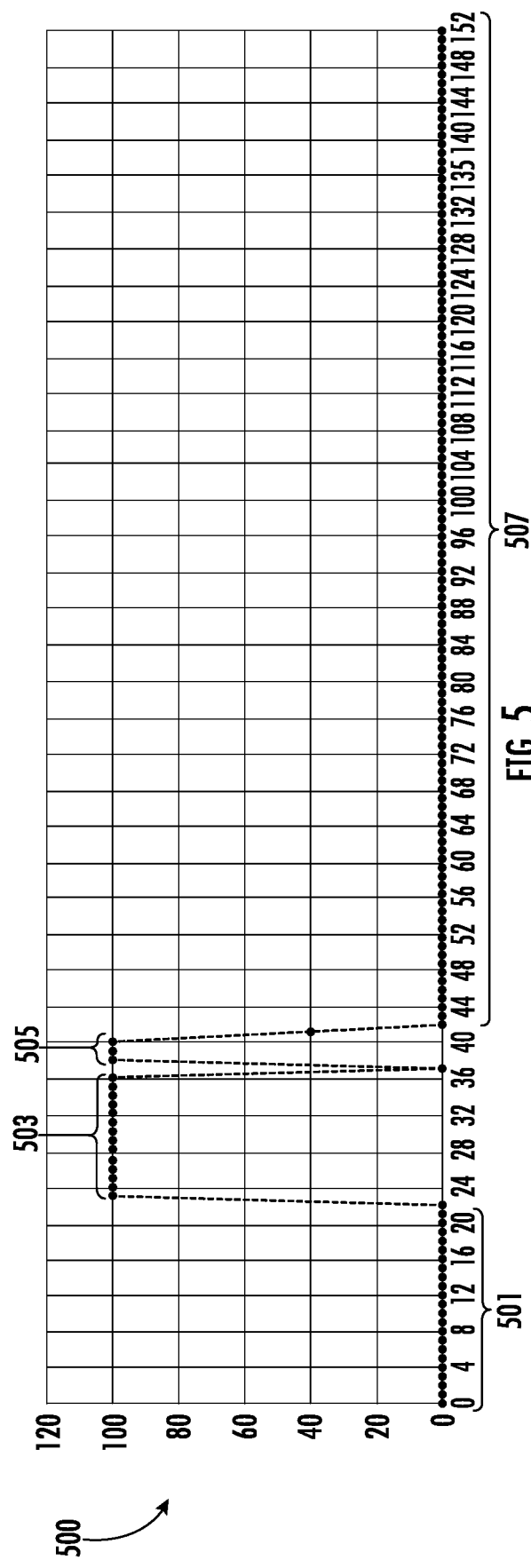
FIG. 5 provides an example line chart illustrating example data points associated with example print media displacement parameters and example RFID communication result parameters.
Figure 6:
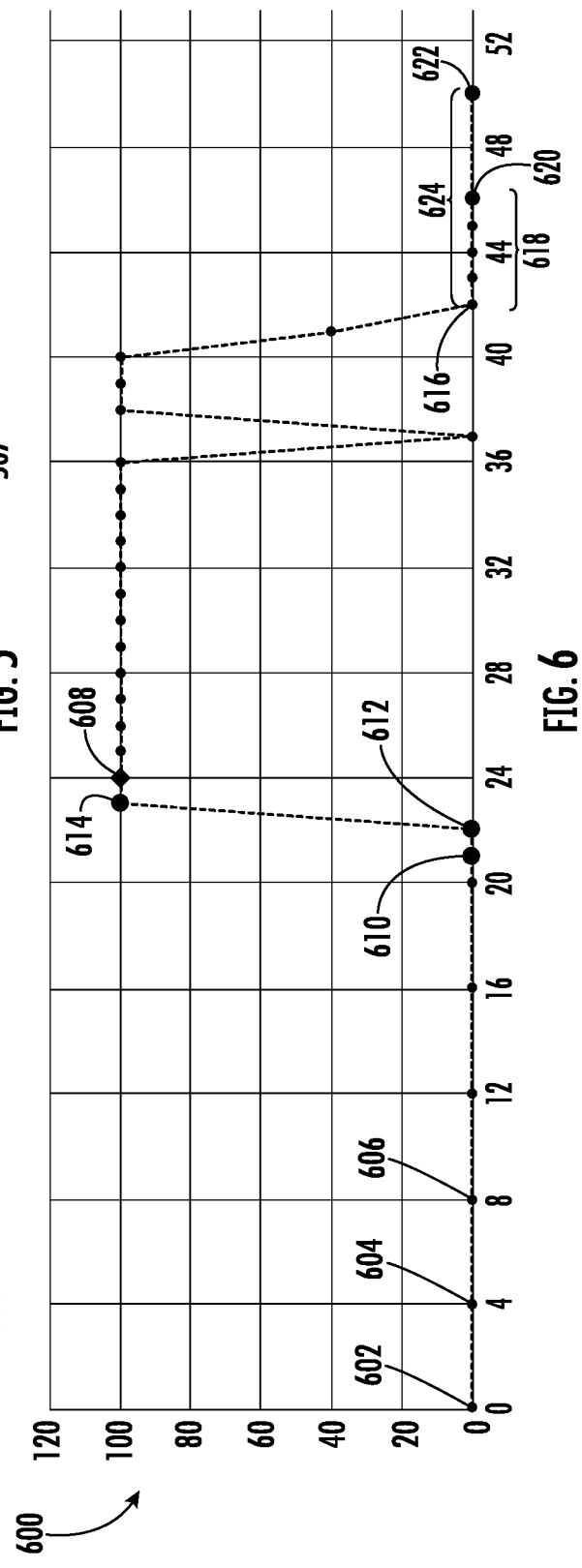
FIG. 6 provides an example line chart illustrating example data points associated with example print media displacement parameters and example RFID communication result parameters in accordance with some embodiments of the present disclosure.

As an example, an example RFID printer calibration algorithm may provide an automated tool that causes the RFID antenna of the example printing apparatus to scan through an entire label from the print media in search for one or more RFID communication windows. For example, the RFID calibration algorithm may suggest a list of most optimum communication window positions and/or RF power settings for the printing apparatus in order to ensure that the RFID tag is always well-placed for programming. Referring now to FIG. 5 and FIG. 6, example line charts illustrating example data points that are generated by executing example RFID printer calibration algorithms are provided.

In the example line charts shown in FIG. 5 and FIG. 6, the X axis corresponds to a print media displacement parameter associated with each data point, and the Y axis corresponds to an RFID communication result parameter associated with each data point.

In the present disclosure, the term "print media displacement parameter" refers to a distance or an amount of change in position or location between a current print media location and the initialized print media location along the media path in either the print media feeding direction or the print media retracting direction. As described above in connection with at least FIG. 1C, when the RFID printer calibration algorithm is initiated, the print media may be retracted by a maximum retraction distance such that a leading label edge of a label of the print media is aligned with the burn line of the printing apparatus. In such an example, the print media displacement parameter indicates a distance between the location of the leading label edge of the label when the print media is at the current print media location and the location of the leading label edge of the label when the print media is at the initialized print media location. Continuing in this example, the print media displacement parameter may indicate how far the leading label edge of the label has traveled from the burn line of the printing apparatus.

In the present disclosure, the term "RFID communication result parameter" refers to a parameter, an attribute, an indicator and/or the like that indicates a success level of the RFID antenna in establishing RFID communications with the print media (for example, in encoding and/or writing data and/or information to an RFID tag of the print media, decoding and/or reading data and/or information from the RFID tag of the print media, and/or the like).

In some embodiments, the RFID communication result parameter may indicate an RFID communication success rate. In the present disclosure, the term "RFID communication success rate" refers to a percentage value that indicates how successful the RFID antenna is at encoding and/or writing data and/or information to an RFID tag, and/or how successful the RFID antenna is at decoding and/or reading data and/or information from the RFID tag.

In some embodiments, example RFID communication result parameters are generated by an example printing apparatus (for example, but not limited to, by a controller of the example printing apparatus). For example, the controller of the printing apparatus may cause the print media to travel along the media path in the print media feeding direction or in the print media retracting direction. In such an example, the processor may transmit control instructions to the RFID antenna of the printing apparatus, such that the RFID antenna may transmit RF signals to encode or write digital data and/or information to the RFID tag, and/or transmit RF signals to decode or read the digital data and/or information from the RFID tag.

As an example, the processor may transmit control instructions to the one or more motors of the printing apparatus to cause the print media to travel in the print media feeding direction to a current print media location. When the print media is at the current print media location, the processor may transmit control instructions to the RFID antenna to encode and/or write data that includes the word "TEST" to the RFID tag, and then transmit control instructions to the RFID antenna to decode and/or read data from the RFID tag. In this example, the data that is decoded from the RFID tag may only indicate the letters "TES" and miss the last letter "T." In such an example, the processor determines that a corresponding RFID communication result parameter of the print media when the print media is at the current print media location indicates an RFID communication success rate of 75%.

In some embodiments, the processor may compare the RFID communication result parameter with an RFID communication success threshold to determine whether the RFID communication result parameter satisfies the RFID communication success threshold. In the present disclosure, the term "RFID communication success threshold" refers to a threshold value or level that represents a boundary or a point beyond which an RFID communication result parameter indicates sufficient success of the RFID antenna in communicating with an RFID tag.

Continuing from the above example, the RFID communication success threshold may be 80%. In such an example, the RFID communication result parameter (which indicates an RFID communication success rate of 75%) does not satisfy the RFID communication success threshold. In other words, the RFID antenna is not sufficiently successful in communicating with the RFID tag of the print media.

While the description above provides an example value of RFID communication success threshold, it is noted that the scope of the present disclosure is not limited to the description above. In some embodiments, an example RFID communication success threshold maybe less than or more than the example value described above.

As illustrated in various examples above, the location of the print media may affect how successfully the RFID antenna can establish RFID communications with the RFID tag. As such, when the processor generates the RFID communication result parameter, the processor associates the RFID communication result parameter with a corresponding print media displacement parameter based on the current location of the print media. For example, the print media displacement parameter may indicate a displacement or a distance between the current print media location (when the RFID communication result parameter is generated) and the initialized print media location. Referring now to FIG. 5 and FIG. 6, example line charts illustrate associations between RFID communication result parameters and print media displacement parameters based on executing RFID printer calibration algorithms are provided.

In the example shown in FIG. 5, the example line chart 500 illustrates data points that are generated by executing an RFID printer calibration algorithm that scans through the entire label by a small step/increment of one millimeter. For example, when executing the RFID printer calibration algorithm, the processor of printing apparatus transmits control instructions to one or more motors of the printing apparatus to cause the print media to move by one millimeter in the print media feeding direction along the media path. At every millimeter, the processor transmits control instructions to the RFID antenna to cause the RFID antenna to attempt to communicate with the RFID tag and generate an RFID communication result parameter that indicates an RFID communication success rate associated with the print media at the corresponding millimeter.

As described above, the X axis in the example line chart 500 shown in FIG. 5 represents the print media displacement parameters (for example, how far the print media has travel from the initialized print media location). In this example, each dot in the example line chart 500 represents a data point for each millimeter where the RFID antenna attempts to communicate with the RFID tag and the processor generates a corresponding RFID communication result parameter.

For example, the processor may cause the RFID antenna to try communicating with the RFID tag along the entire length of the label in one millimeter increment. In such an example, the processor may transmit control instructions to one or more motors to cause the print media to move by one millimeter in the print media feeding direction, transmit control instructions to the RFID antenna for generating an RFID communication result parameter, and then transmit control instructions to one or more motors to cause the print media to move by another millimeter in the print media feeding direction. The processor may repeat these steps until the distance between the current print media location and the initialized print media location equals the length of the label (in other words, the RFID antenna has scanned through the entire label).

As an example, the length of the label may be 6 inches (which corresponds to 152 millimeters). In this example, there may be a total of 152 data points recorded, one for each millimeter.

The example line chart 500 shown in FIG. 5 illustrates that various print media displacement parameters of the print media can be categorized into different print media displacement ranges based on the RFID communication result parameters associated with these print media displacement parameters.

For example, RFID communication result parameters associated with print media displacement parameters within the print media displacement range 503 may indicate RFID communication success rates of 100%. Similarly, RFID communication result parameters associated with print media displacement parameters within the print media displacement range 505 also indicate RFID communication success rates of 100%. Similar to various examples described above, the processor may compare the RFID communication success rates with an RFID communication success threshold, and determine that these RFID communication result parameters satisfy the RFID communication success threshold.

Additionally, or alternatively, RFID communication result parameters associated with print media displacement parameters within the print media displacement range 501 may indicate RFID communication success rates of 0%. Similarly, RFID communication result parameters associated with print media displacement parameters within the print media displacement range 507 also indicate RFID communication success rates of 0%. Similar to various examples described above, the processor may compare the RFID communication success rates with an RFID communication success threshold, and determine that these RFID communication result parameters do not satisfy the RFID communication success threshold.

In some embodiments, the RFID communication window parameter of the print media comprises one or more print media displacement ranges, and each of the one or more print media displacement ranges comprises print media displacement parameters associated with RFID communication result parameters that satisfy the RFID communication success threshold. Continuing from the example above, the print media displacement range 503 defines an RFID communication window associated with the print media.

In some embodiments, the RFID communication window parameter of the print media comprises one or more print media displacement spans that are determined based on the one or more print media displacement ranges described above. For example, an example print media displacement span may be determined based on determining a smallest print media displacement parameter and a largest print media displacement parameter from an example print media displacement range (that is associated with RFID communication result parameters satisfying the RFID communication success threshold), and determining a difference between the largest print media displacement parameter and the smallest print media displacement parameter. For example, an example print media displacement span of the print media displacement range 503 indicates a distance of successful attempts by the RFID antenna in communicating with the RFID tag.

In some embodiments, the processor may determine that a print media displacement range defines an RFID communication window associated with the print media if (1) RFID communication result parameters associated with the print media displacement range satisfy the RFID communication success threshold, and (2) the print media displacement span associated with the print media displacement range satisfy a RFID communication window threshold.

Continuing from the example above, the processor may determine that the RFID communication result parameters associated the print media displacement range 505 satisfy the RFID communication success threshold, but the print media displacement span associated with the print media displacement range 505 is less than the RFID communication window threshold. In this example, the processor may determine that the print media displacement range 505 does not define an RFID communication window of the print media.

In some embodiments, the processor may determine the RFID communication window threshold based on the RFID tag deviation range described above. For example, the RFID communication window threshold may be determined to be the same as the RFID tag deviation range (for example, four millimeters) to provide technical benefit and advantages for accommodating variabilities described above (such as, but not limited to, variations in printer registration and/or variations manufacturing the print media). Additionally, or alternatively, the RFID communication window threshold may be set at less than or more than the RFID tag deviation range.

While the RFID calibration algorithm described above in connection with FIG. 5 provides a solution for determining the RFID communication window parameter associated with the print media, it is noted that such an RFID calibration algorithm is plagued by many technical challenges and difficulties.

As described above, the RFID calibration algorithm relies on a fixed increment of one millimeter for feeding the print media. As such, executing the RFID calibration algorithm can be very time-consuming and energy-consuming, and may lead to inaccurate results. For example, calibrating a 6-inch label requires the RFID printer to communicate with the print media a total of 152 times. The longer the label, the longer that it takes to complete calibration. If more than one RF power setting for clarification is tested, the time to scan the entire label is multiplied by the number of the RF power settings that are selected for testing. In many implementations, calibrating a label may take thirteen or more minutes. The lengthy calibration may hinder the performance of the RFID printer, resulting in a decrease in efficiency and an increase in power consumption for calibrating the RFID printer.

Various embodiments of the present disclosure overcome these technical challenges and difficulties. For example, various embodiments of the present disclosure reduce time and energy required to calibrate print media based at least in part on setting and adjusting a media feeding step parameter, therefore providing various technical improvements and advantages such as, but not limited to, improved accuracy in calibration and reduced level of power consumption.

In the present disclosure, the term "media feeding step parameter" refers to a parameter, a variable, or a property that indicates a distance traveled by the print media in the print media feeding direction along the media path subsequent to the RFID antenna communicating with the print media for generating an RFID communication result parameter and prior to the RFID antenna communicating with the print media for generating the next RFID communication result parameter. In some embodiments, the media feeding step parameter comprises a feeding step value that represents an incremental displacement of the print media between print media locations where RFID communication result parameters are generated. For example, the feeding step value defines how many millimeters the print media need to move in the print media feeding direction to test reading and/or writing performance of the print media under calibration. In some embodiments, the feeding step value of the media feeding step parameter may be chosen from two values that include a narrow feeding step value and a wide feeding step value, additional details of which are described herein.

For example, the processor may generate an RFID communication result parameter and then transmit control instructions to one or more motors to cause feeding the print media based on the media feeding step parameter. In such an example, the one or more motors causes the print media to travel by a distance (as specified by the media feeding step parameter) to a new print media location, and the processor causes the RFID antenna to attempt to establish RFID communications with the print media when the print media is at the new print media location for generating an RFID communication result parameter.

Referring now to FIG. 6, an example line chart 600 that illustrates data points generated by executing an example RFID calibration algorithm in accordance with some embodiments of the present disclosure is provided.

In some embodiments, when the example RFID calibration algorithm is initiated, the processor may transmit one or more control instructions to one or more motors to cause the print media to retract by a maximum retraction distance (for example, causing the leading label edge of a label to move from the tear bar to the burn line) and arrive at the initialized print media location (for example, as shown in FIG. 1C). In some embodiments, the processor may transmit one or more control instructions to the RFID antenna of the printing apparatus for generating an initial RFID communication result parameter. In the example shown in FIG. 6, the initial RFID communication result parameter associated with the initialized print media location is represented by the data point 602.

In some embodiments, subsequent to generating the initial RFID communication result parameter, the processor may transmit one or more control instructions to one or more motors of the printing apparatus to cause feeding the print media based on the media feeding step parameter. In some embodiments, the media feeding step parameter is set based on a wide feeding step value.

In the present disclosure, the term "wide feeding step value" refers to a feeding step value for the media feeding step parameter that represents a gross stepping distance for the print media.

In some embodiments, the wide feeding step value may be determined based at least in part on the RFID communication window threshold. As an example, a valid RFID communication window may need to be at least four millimeters wide so that the RFID antenna can read or write an RFID tag with 100% success. In such an example, the RFID communication window threshold (e.g., a minimum size of the RFID communication window) is determined to be four millimeters to cover the RFID tag deviation range. In some embodiments, the wide feeding step value is set to equal the RFID communication window threshold (for example, four millimeters) so as to provide technical benefits and advantages such as, but not limited to, reducing the number of instances for the RFID antenna to read or write the RFID tag without missing any potential communication window associated with the RFID tag.

While the description above provides an example value of wide feeding step value, it is noted that the scope of the present disclosure is not limited to the description above. In some examples, an example wide feeding step value may be less than or more than four millimeters.

In some embodiments, subsequent to generating the initial RFID communication result parameter, the processor transmits one or more control instructions to one or more motors to cause feeding the print media based on the media feeding step parameter (for example, move the print media by an increment of four millimeters) until the RFID communication result parameter satisfies the RFID communication success threshold. In particular, before each time the print media is fed based on the media feeding step parameter, the processor transmits one or more control instructions to the RFID antenna and causes the RFID antenna to perform a series of read and/or write operations to check whether an RFID tag can be detected. In some embodiments, the RFID communication success rate associated with read and/or write operations may be recorded and compared with the RFID communication success threshold. If the RFID communication threshold is not satisfied, the processor causes the print media to move in the print media feeding direction by a distance that equals to a wide feeding step value (for example, by another four millimeters), and may check whether an RFID tag can be detected. If the RFID communication threshold is satisfied, the processor may stop causing feeding the print media and may instead cause retracting the print media by a retraction distance in some embodiments.

In the example shown in FIG. 6, the processor causes feeding the print media based on the media feeding step parameter that indicates the wide feeding step value of four millimeters, and generates a RFID communication result parameter that is represented by the data point 604. Because the RFID communication result parameter associated with the data point 604 does not satisfy the RFID communication success threshold, the processor causes feeding the print media based on the media feeding step parameter that indicates the wide feeding step value of four millimeters, and generates another RFID communication result parameter that is represented by the data point 606. In some embodiments, the processor repeats these steps until the RFID communication result parameter associated with a data point satisfies the RFID communication success threshold and is associated with an initial RFID communication success. In the example shown in FIG. 6, the RFID communication result parameter associated with the data point 608 indicates an initial or first RFID communication success.

In some embodiments, subsequent to determining that an RFID communication result parameter is associated with an initial RFID communication success, the processor transmits one or more control instructions to one or more motors of the printing apparatus to cause retracting the print media along a media path.

In some embodiments, the processor causes the print media to retract by a retraction distance. In some embodiments, retracting the print media is to ensure the detection of the edge of the RFID communication window. As described above, an example RFID communication window parameter may comprise a range of print media displacement parameters. In such an example, the edges of the RFID communication window may be defined based on the smallest print media displacement parameter and the largest print media displacement parameter from the range of the print media displacement parameters.

In some embodiments, the retraction distance is less than the distance indicated by the wide feeding step value. In some embodiments, an example retraction distance is three millimeters. Additionally, or alternatively, the retraction distance may be less than or more than three millimeters.

In some embodiments, subsequent to retracting the print media along the media path, the processor updates the media feeding step parameter based on a narrow feeding step value. For example, the processor reduces the feeding step value indicated by the media feeding step parameter from the wide media feeding step value to the narrow media feeding step value.

In the present disclosure, the term "narrow feeding step value" refers to a feeding step value for the media feeding step parameter that represents a fine stepping distance for the print media. In some embodiments, the narrow feeding step value may be determined based at least in part on a minimum linear step distance provided by the one or more motors. In some embodiments, the narrow feeding step value is one millimeter. In some embodiments, the narrow feeding step value is less than or more than one millimeter.

In some embodiments, the example retraction distance described above for retracting the print media is determined based on the wide feeding step value and the narrow feeding step value. For example, the example retraction distance may correspond to a difference between the wide feeding step value and the narrow feeding step value so that the edge of the RFID communication window can be precisely determined.

Referring back to the example shown in FIG. 6, the processor generates an RFID communication result parameter that is represented by the data point 610. For example, data point 610 indicates an RFID communication success rate after the print media is retracted by the reaction distance described above. In some embodiments, the processor then causes feeding the print media based on the media feeding step parameter that indicates a narrow feeding step value of one millimeter, and generates an RFID communication result parameter that is represented by the data point 612. In some embodiments, the processor then causes feeding the print media based on the media feeding step parameter that indicates a narrow feeding step value of one millimeter, and generates an RFID communication result parameter that is represented by the data point 614.

In the example shown in FIG. 6, while the RFID communication result parameter represented by the data point 612 does not satisfy the RFID communication success threshold, the RFID communication result parameter represented by the data point 614 satisfies the RFID communication success threshold. As such, the data point 614 represents an edge of the RFID communication window associated with the print media.

As illustrated above, updating the media feeding step parameter based on a narrow feeding step value allows a precise detection of the RFID communication window. For example, by continuing feeding the print media by one millimeter distance and performing a read/write operation at every step, various embodiments of the present disclosure accurately detect the location and the width of RFID communication window.

In some embodiments, manufacturing specification of the print media may define how many RFID communication windows are associated with each label of the print media. In some embodiments, a label may be associated with only one RFID communication window. In some embodiments, a label may be associated with two (or more) RFID communication windows.

In some embodiments, after one or two RFID communication windows are detected and no more RFID communication result parameters satisfy the RFID communication success threshold, various embodiments of the present disclosure may determine that the entire RFID tag of the label has been scanned and that no additional scanning needs to be performed so as to provide the technical benefits and advantages of accelerating the calibration of the RFID printer.

As an example, after the end of the RFID communication window, all RFID communication result parameters (such as the RFID communication result parameter represented by the data point 616) may indicate an RFID communication success rate of 0%. In some embodiments, the processor may determine an RFID communication failure span parameter and compare the RFID communication failure span parameter with one or more thresholds.

In the present disclosure, the term "RFID communication failure span parameter" refers to a parameter, an attribute, an indicator and/or the like that comprises, represents, and/or indicates a span of print media displacement parameters that is associated with a region, an area, and/or a range of the print media where an RFID antenna may not establish RFID communications and/or the success rates of the RFID communications do not satisfy a success threshold.

In some embodiments, a processor may determine an example RFID communication failure span parameter based at least in part on one or more print media displacement parameters that define one or more boundaries of a range of print media displacement parameters associated with continuous RFID communication failure. Referring back to the example shown in FIG. 6, subsequent to determining that the RFID communication result parameter represented by the data point 620 does not satisfy the RFID communication success threshold, the processor may determine an RFID communication failure span parameter associated with the data point 620. As an example, the processor may traverse other data points collected prior to data point 620 to determine a starting data point of the continuous RFID communication failure. In the example shown in FIG. 6, the processor may determine that the data point 616 is associated with an RFID communication result parameter that represents a first RFID communication failure subsequent to continuous RFID communication successes, and therefore is a starting data point of the continuous RFID communication failure. In such an example, the processor determines the RFID communication failure span parameter based at least in part on calculating a print media displacement span 618 between the print media displacement parameter represented by the data point 616 and the print media displacement parameter represented by the data point 620.

In some embodiments, the processor may compare the RFID communication failure span parameter with a wide feeding threshold to determine whether the RFID communication failure span parameter satisfies the wide feeding threshold. In the present disclosure, the term "wide feeding threshold" refers to a threshold value or level of the RFID communication failure span parameter for updating the media feeding step parameter from a narrow feeding step value to a wide feeding step value.

For example, the wide feeding threshold may define a minimum print media displacement span. In such an example, if the print media displacement span associated with an RFID communication failure span parameter is more than the wide feeding threshold, the processor determines that RFID communication failure has prolonged for a sufficient distance such that the media feeding step parameter should be updated from the narrow feeding step value to the wide feeding step value. In some embodiments, the processor increases the feeding step value of the media feeding step parameter when the RFID communication failure span parameter satisfies the wide feeding threshold.

In some embodiments, the wide feeding threshold may be six millimeters. In some embodiments, the wide feeding threshold may be less than or more than six millimeters.

Referring back to the example shown in FIG. 6, the processor may determine whether the print media displacement span 618 satisfies the wide feeding threshold (for example, six millimeters). In some embodiments, the processor may determine that the print media displacement span 618 satisfies the wide feeding threshold (for example, the distance of failed attempts represented by the print media displacement span 618 is more than six millimeters) and may update the media feeding step parameter from indicating the narrow feeding step value to indicating the wide feeding step value. In such examples, when no more RFID communication window is found for a given distance (for example, but not limited to, six millimeters), the media feeding step parameter is reverted to wide feeding step value.

In some embodiments, the processor may compare the RFID communication failure span parameter with a stop feeding threshold to determine whether the RFID communication failure span parameter satisfies the stop feeding threshold. In the present disclosure, the term "stop feeding threshold" refers to a threshold value or level of the RFID communication failure span parameter for stop feeding the print media.

For example, the stop feeding threshold may define a minimum print media displacement span. In such an example, if the print media displacement span associated with an RFID communication failure span parameter is more than the stop feeding threshold, the processor determines that the RFID communication failure has prolonged for a sufficient distance such that feeding the print media should be stopped. In some embodiments, the processor ends or exits the RFID printer calibration algorithm in response to determining that the RFID communication failure span parameter satisfies the stop feeding threshold.

In some embodiments, the stop feeding threshold may be ten millimeters. In some embodiments, the stop feeding threshold may be less than or more than ten millimeters.

Referring back to the example shown in FIG. 6, subsequent to determining the RFID communication result parameter represented by the data point 622 does not satisfy the RFID communication success threshold, the processor determines an RFID communication failure span parameter associated with the data point 622. Similar to those described above, the processor may traverse other data points collected prior to the data point 622 to determine a starting data point of the continuous RFID communication failure, and may determine that the data point 616 is a starting data point of the continuous RFID communication failure. In such an example, the processor calculates the RFID communication failure span parameter based at least in part on determining a print media displacement span 624 between the print media displacement parameter represented by the data point 616 and the print media displacement parameter represented by the data point 622. The processor may determine whether the print media displacement span 624 satisfies the stop feeding threshold (for example, ten millimeters). In some embodiments, the processor may determine that the print media displacement span 624 satisfies the stop feeding threshold (for example, the distance of failed attempts represented by the print media displacement span 624 is more than ten millimeters) and may cause stop feeding the print media. In such examples, when no more RFID communication window is found for a given distance (for example, but not limited to, ten millimeters), the feeding of the print media stops and the RFID printer calibration ends, thereby providing the technical benefits and advantages such as, but not limited to, accelerating the RFID printer calibration.

In some embodiments, data points that are generated based on executing an example RFID printer calibration algorithms (for example, the example shown on FIG. 6) allow the processor to perform data analysis and determine printer settings (for example, but not limited to, RFID tag settings, RFID antenna communication power settings, and/or the like) for setting up the printer, details of which are described herein.

The example shown in FIG. 6 illustrates various technical benefits and advantages of the present disclosure.

For example, various embodiments of the present disclosure dynamically update the media feeding step parameter based on RFID communication result parameters. For example, various embodiments of the present disclosure may set the media feeding step parameter based on a wide feeding step value so that the print media may feed faster when no RFID communication are present. Various embodiments of the present disclosure may set the media feeding step parameter based on a narrow feeding step value when an RFID communication window is identified.

As another example, various embodiments of the present disclosure determines a timeout zone to end the RFID printer calibration algorithm when at least one previous RFID communication window has been found and that no more RFID communication window is detected for a given distance (for example, based on comparing the print media displacement parameter with the wide feeding threshold and the stop feeding threshold described above). As the data points that truly matter are those related to the size and the position of the RFID communication window, the dead zones before the RFID communication window and after the RFID communication window do not need to have so many data points collected as compared to those within the RFID communication window.

As another example, various embodiments of the present disclosure adjust wide feeding step value, the RFID antenna communication power, and/or the like based at least in part on the length of the label, which may quicken the execution of the RFID printer calibration algorithm.

As such, various embodiments of the present disclosure accelerate RFID printer calibration, reduce the amount of data points collected while retaining accurate calibration results. For example, the example shown in FIG. 6 may complete an RFID printer calibration process in 33 steps, compared to the 152 steps from the example shown in FIG. 5. As another example, executing an example RFID printer calibration algorithm for a label of 4 by 6 inches using a signal RFID antenna communication power may take 16 seconds or less in accordance with some embodiments of the present disclosure, compared to the 87 seconds of time that is taken by executing other RFID printer calibration algorithms. As such, various embodiments of the present disclosure improve usability of RFID printer and make the RFID calibration process much faster and more efficient while retaining the accuracy of calibration results.

Various example methods described herein including, for example, those as shown in FIG. 7A, FIG. 7B, FIG. 7C, and FIG. 7D, provide various technical advantages and/or improvements described above. For example, example flow diagrams in FIG. 7A, FIG. 7B, FIG. 7C, and FIG. 7D illustrate example methods of calibrating an example printing apparatus (such as, but not limited to, the example printing apparatus 100 described above in connection with at least FIG. 1A, FIG. 1B, and FIG. 1C, the example printing apparatus 200 described above in connection with at least FIG. 2A and FIG. 2B, and/or the example printing apparatus 300 described above in connection with FIG. 3) in accordance with some embodiments of the present disclosure.

It is noted that each block of the flowchart, and combinations of blocks in the flowchart, may be implemented by various means such as hardware, firmware, circuitry and/or other devices associated with execution of software including one or more computer program instructions. For example, one or more of the methods described in FIG. 7A, FIG. 7B, FIG. 7C, and FIG. 7D may be embodied by computer program instructions, which may be stored by at least one non-transitory memory of an apparatus employing an embodiment of the present disclosure and executed by at least one processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Figure 7A:
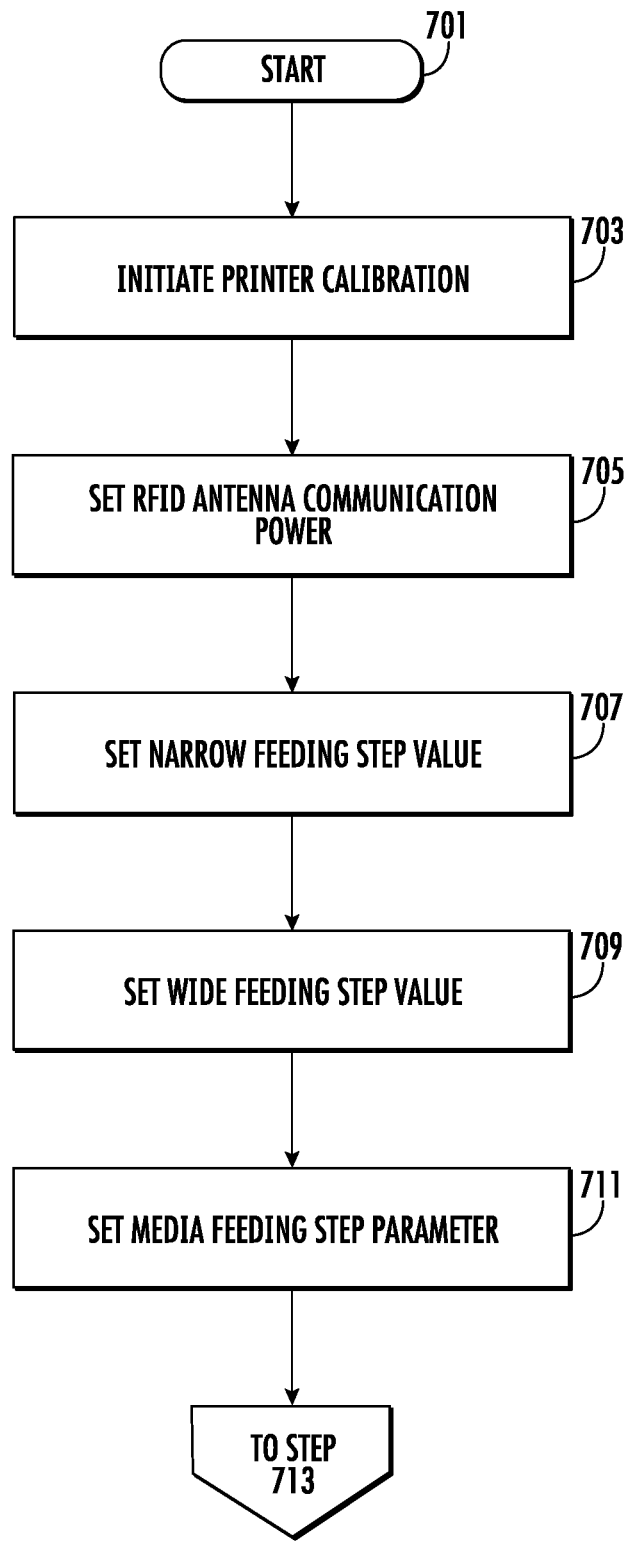
FIG. 7A, FIG. 7B, FIG. 7C, and FIG. 7D illustrate example methods associated with calibrating example printing apparatuses in accordance with some embodiments of the present disclosure.

Referring now to FIG. 7A, example methods in accordance with some embodiments of the present disclosure start at step/operation 701. Subsequent to and/or in response to step/operation 701, some example methods in accordance with some embodiments of the present disclosure proceed to step/operation 703. In some embodiments, a processor (such as, but not limited to, the processor 305 of the printing apparatus 300 described above in connection with at least FIG. 3) initiates printer calibration at step/operation 703.

In some embodiments, the processor may initiate the RFID printer calibration algorithm to determine one or more parameters associated with the print media. For example, the processor may retrieve data and/or information from a printer memory (such as, but not limited to, the memory 303 illustrated above in connection with FIG. 3) to determine the one or more parameters associated with the print media.

As an example, the processor may determine a print media type parameter associated with the print media. For example, the print media type parameter may indicate a type associated with the print media such as, but not limited to, continuous print media, non-continuous print media, and/or the like.

Additionally, or alternatively, the processor may determine a label length parameter and/or a media length parameter associated with the print media. For example, the label length parameter may indicate a length of each label of the print media. Additionally, or alternatively, the media length parameter may indicate a length of the entire print media.

Additionally, or alternatively, the processor may determine a gap size parameter and/or a black mark (BM) size parameter associated with the print media. In some embodiments, the terms "gap" or "BM" refer to a space between two adjacent labels of the print media. In some embodiments, the gap size parameter or the BM size parameter may be used by the RFID printer in determining the leading edge of a label and/or the trailing edge of the label.

In some embodiments, based on the one or more parameters associated with the print media (including, but not limited to, print media type parameters, label length parameters, media length parameters, gap size parameters and/or BM size parameters), the processor may set one or more parameters associated with the RFID printer calibration algorithm (including, but not limited to, the RFID antenna communication power, the narrow feeding step value, the wide feeding step value, and/or the like).

For example, subsequent to and/or in response to step/operation 703, some example methods in accordance with some embodiments of the present disclosure proceed to step/operation 705. In some embodiments, a processor (such as, but not limited to, the processor 305 of the printing apparatus 300 described above in connection with at least FIG. 3) sets the RFID antenna communication power at step/operation 705.

In some embodiments, the RFID antenna communication power refers to the power that is used by an RFID antenna for communicating with RFID tags when executing the RFID printer calibration algorithm. In some embodiments, the processor sets the RFID antenna communication power based at least in part on the one or more parameters associated with the print media determined at step/operation 703 when initiating the processor calibration. For example, the processor may determine the RFID antenna communication power based at least in part on the label length parameter and/or the media length parameter associated with the print media. Additionally, or alternatively, the processor may determine the RFID antenna communication power based at least in part on the gap size parameter and/or the BM size parameter associated with the print media.

As an example, if the media length parameter (and/or the label length parameter) indicates a media length (and/or the label length) that is more than a predefined "media_lengh_thresold" constant, the processor may set the RFID antenna communication power according to a larger predefined value (for example, 21 dBm or 24 dBm) and/or a larger predefined range (for example, between 21 dBm and 24 dBm), such that a wider RFID communication window can be detected. As another example, if the media length parameter (and/or the label length parameter) indicates a media length (and/or the label length) that is less than a predefined "media_lengh_thresold" constant, the processor may set the RFID antenna communication power according to a smaller predefined value (for example, 18 dBm or 21 dBm) and/or a smaller predefined range (for example, between 18 dBm and 21 dBm, between 15 dBm and 18 dBm, and/or the like).

As an example, a longer print media may provide a longer pitch between two adjacent RFID tags, hence a higher RF power can be used without the risk of detecting two RFID tags simultaneously, which can provide technical advantages and benefits such as, but not limited to, widen the RFID communication window. As another example, the RFID printer may use a lower RF power when the pitch between RFID tags is smaller to avoid detecting two RFID tags at the same time.

While the description above provides some example values and ranges associated with the RFID antenna communication powers, it is noted that the scope of the present disclosure is not limited to those examples.

While the description above provides an example of using a predefined "media_lengh_thresold" constant, it is noted that the scope of the present disclosure is not limited to the description above. In some embodiments, the processor may define more than one threshold for the label length parameter, the media length parameter, and/or the like. For example, the processor may subdivide the media length based on thresholds into different media length ranges that include, but not limited to, a long media length range, a medium media length range, a short media length range, and/or the like. In such an example, the processor uses appropriate RF power for each media length range.

Subsequent to and/or in response to step/operation 705, some example methods in accordance with some embodiments of the present disclosure proceed to step/operation 707. In some embodiments, a processor (such as, but not limited to, the processor 305 of the printing apparatus 300 described above in connection with at least FIG. 3) sets a narrow feeding step value at step/operation 707.

As described above, the narrow feeding step value indicates a fine stepping distance for the print media. In some embodiments, the processor may set the narrow feeding step value based on the media length parameter and/or the label length parameter determined at step/operation 703. For example, the processor may determine a smaller narrow feeding step value if the label length parameter indicates a shorter label. Additionally, or alternatively, the processor may set the narrow feeding step value based on the step value associated with the one or more motors of the RFID printer as described above.

In some embodiments, the processor may set the narrow feeding step value as one millimeter. Additionally, or alternatively, the processor may set the narrow feeding step value as less than or more than one millimeter.

Subsequent to and/or in response to step/operation 707, some example methods in accordance with some embodiments of the present disclosure proceed to step/operation 709. In some embodiments, a processor (such as, but not limited to, the processor 305 of the printing apparatus 300 described above in connection with at least FIG. 3) sets a wide feeding step value at step/operation 709.

As described above, the wide feeding step value represents a gross stepping distance for the print media. In some embodiments, the processor may set the wide feeding step value based on the RFID communication window threshold as described above. Additionally, or alternatively, the processor may set the wide feeding step value based on the media length parameter and/or the label length parameter determined at step/operation 703 (for example, a larger wide feeding step value if the label length parameter indicates a longer label).

In some embodiments, the processor may set the wide feeding step value as four millimeters. Additionally, or alternatively, the processor may set the wide feeding step value as less than four or more than four millimeters.

In some embodiments, a processor (such as, but not limited to, the processor 305 of the printing apparatus 300 described above in connection with at least FIG. 3) sets the retraction distance for retracting the print media. In some embodiments, the processor may set the retraction distance based at least in part on subtracting the narrow feeding step value from the wide feeding step value.

For example, if the wide feeding step value indicates four millimeters and the narrow feeding step value indicates one millimeter, the retraction distance may be set as three millimeters. Additionally, or alternatively, the retraction distance may be set at other values.

Subsequent to and/or in response to step/operation 709, some example methods in accordance with some embodiments of the present disclosure proceed to step/operation 711. In some embodiments, a processor (such as, but not limited to, the processor 305 of the printing apparatus 300 described above in connection with at least FIG. 3) sets the media feeding step parameter at step/operation 711.

In some embodiments, the processor sets the media feeding step parameter based on the wide feeding step value determined at step/operation 709. For example, when the processor initially start executing the RFID printer calibration algorithm, setting the media feeding step parameter based on the wide feeding step value allows the RFID printer to perform gross steeping, providing technical benefits and advantages such as, but not limited to, accelerating the RFID printer calibration.

Figure 7B:
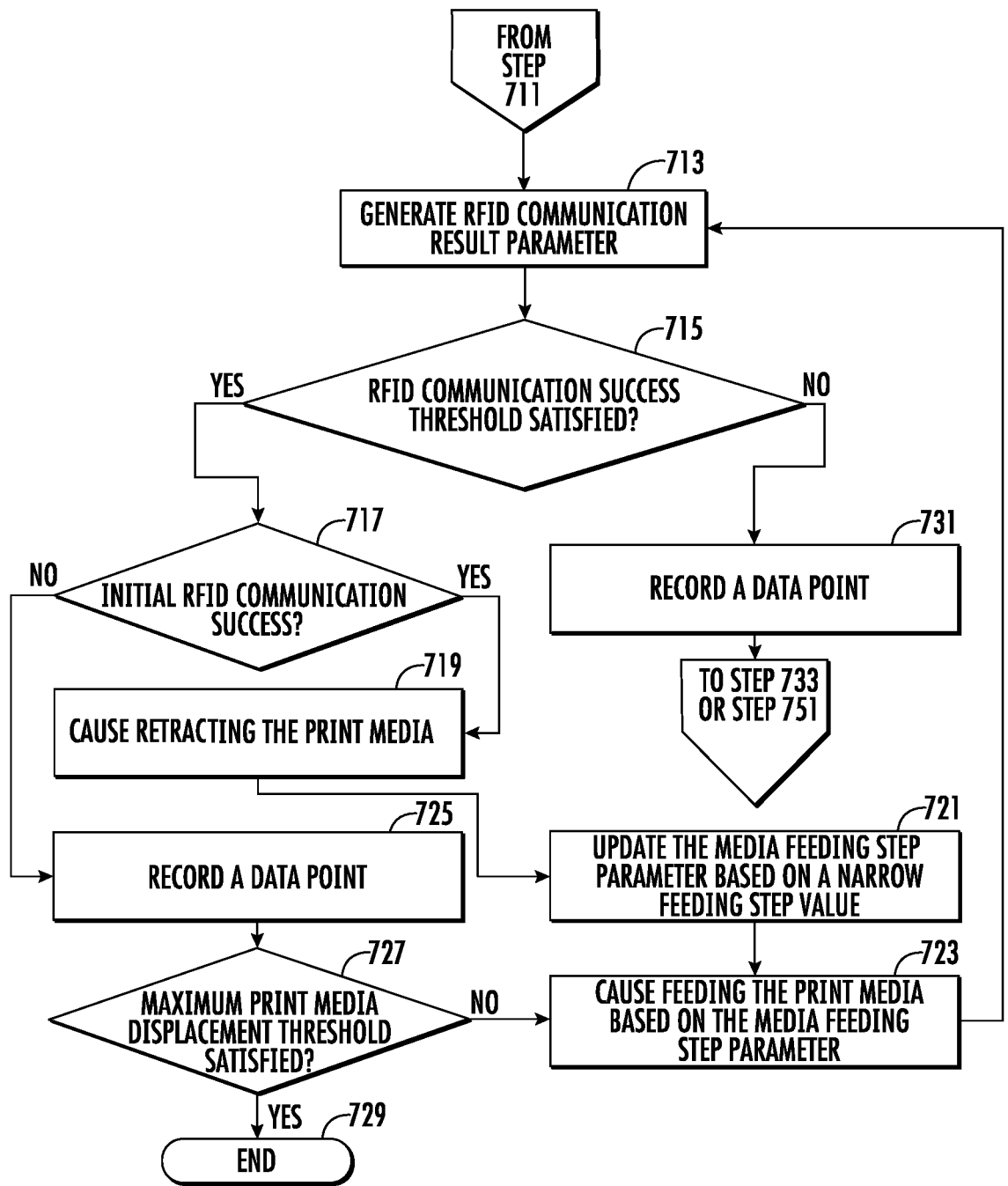

Subsequent to and/or in response to step/operation 711, some example methods in accordance with some embodiments of the present disclosure proceed to step/operation 713 as shown in FIG. 7B.

Referring now to FIG. 7B, subsequent to and/or in response to step/operation 711 from FIG. 7A described above, some example methods in accordance with some embodiments of the present disclosure proceed to step/operation 713. In some embodiments, a processor (such as, but not limited to, the processor 305 of the printing apparatus 300 described above in connection with at least FIG. 3) generates an RFID communication result parameter at step/operation 713.

Similar to various examples described above, the processor may generate an RFID communication result parameter based at least in part on causing the RFID antenna of the example printing apparatus to perform or attempt to perform one or more RFID communication operations.

For example, the RFID antenna of the example printing apparatus may transmit RF encoding signals to an RFID tag of the print media with testing data and/or information, and subsequently transmit RFID decoding signals to the RFID tag of the print media to determine how much testing data and/or information has been encoded in the RFID tag. In some embodiments, the RFID communication result parameter may comprise an RFID communication success rate that indicates a percentage value of how successful the RFID antenna is at encoding/decoding the RFID tag.

In some embodiments, the RFID communication result parameter is associated with a print media displacement parameter that is related to the print media. As described above, the print media displacement parameter indicates how far the print media (for example, a label of the print media) has traveled from the initialized print media location when the RFID antenna attempts to communicate with the print media to generate the RFID communication result parameter at step/operation 713.

Subsequent to and/or in response to step/operation 713, some example methods in accordance with some embodiments of the present disclosure proceed to step/operation 715. In some embodiments, a processor (such as, but not limited to, the processor 305 of the printing apparatus 300 described above in connection with at least FIG. 3) determines whether the RFID communication success threshold is satisfied at step/operation 715.

In some embodiments, the apparatus determines whether the RFID communication result parameter generated at step/operation 713 satisfies the RFID communication success threshold. For example, the processor may determine whether the RFID communication success rate of the RFID communication result parameter is more than the RFID communication success threshold. If the RFID communication success rate is more than the RFID communication success threshold, the processor may determine that the RFID communication success threshold is satisfied. If the RFID communication success rate is less than the RFID communication success threshold, the processor may determine that the RFID communication success threshold is not satisfied.

In some embodiments, the processor determines that the RFID communication success threshold is satisfied at step/operation 715. In response to determining that the RFID communication success threshold is satisfied at step/operation 715, some example methods in accordance with some embodiments of the present disclosure proceed to step/operation 717. In some embodiments, a processor (such as, but not limited to, the processor 305 of the printing apparatus 300 described above in connection with at least FIG. 3) determines whether the RFID communication result parameter is associated with an initial RFID communication success at step/operation 717.

In some embodiments, the processor may determine whether the RFID communication result parameter generated at step/operation 713 is associated with an initial RFID communication success based at least in part on an RFID communication success flag parameter. In the present disclosure, the term "RFID communication success flag parameter" refers to a parameter, an attribute, an indicator and/or the like that comprises, represents, and/or indicates whether an RFID communication success has previously occurred. As an example, the RFID communication success flag parameter may indicate whether a current RFID communication result parameter indicates a continued RFID communication success from a last RFID communication result parameter generated prior to the current RFID communication result parameter.

In some embodiments, the RFID communication success flag parameter may comprise a Boolean value (for example, either one or zero). For example, if the RFID communication success flag parameter indicates a value of one, the processor determine that an RFID communication success has previously occurred (for example, the last RFID communication result parameter also indicates an RFID communication success), and therefore the RFID communication result parameter generated at step/operation 713 is not associated with an initial RFID communication success. As another example, if the RFID communication success flag parameter indicates a value of zero, the processor determine that an RFID communication success has not previously occurred (for example, the last RFID communication result parameter does not indicate an RFID communication success), and therefore the RFID communication result parameter generated at step/operation 713 is associated with an initial RFID communication success.

While the description above provides an example of determining whether the RFID communication result parameter is associated with an initial RFID communication success, it is noted that the scope of the present disclosure is not limited to the description above.

In some embodiments, the processor determines that the RFID communication result parameter is associated with an initial RFID communication success at step/operation 715. In response to determining that the RFID communication result parameter is associated with an initial RFID communication success at step/operation 717, some example methods in accordance with some embodiments of the present disclosure proceed to step/operation 719. In some embodiments, a processor (such as, but not limited to, the processor 305 of the printing apparatus 300 described above in connection with at least FIG. 3) causes retracting the print media at step/operation 719.

For example, in response to determining that the RFID communication result parameter generated at step/operation 713 indicates an initial success in communicating with the RFID tag of the print media, the processor may transmit one or more control instructions to one or more motors of the printing apparatus. In such an example, the control instructions causes retracting the print media along the media path by a retraction distance.

Referring back to the example shown in FIG. 6, the data point 608 may correspond to an RFID communication result parameter that is associated with an initial RFID communication success as described above. In such an example, the processor may cause retracting the print media along the media path and subsequently generate an RFID communication result parameter as represented by the data point 610.

Referring back to FIG. 7B, subsequent to and/or in response to step/operation 719, some example methods in accordance with some embodiments of the present disclosure proceed to step/operation 721. In some embodiments, a processor (such as, but not limited to, the processor 305 of the printing apparatus 300 described above in connection with at least FIG. 3) updates the media feeding step parameter based on a narrow feeding step value at step/operation 721.

For example, as described above in connection with at least step/operation 711, the processor may initially set the media feeding step parameter based on a wide feeding step value. In such an example, when the processor determines that the RFID communication result parameter is associated with the initial RFID communication success, the processor updates the media feeding step parameter so that it indicates a narrow feeding step value, enabling feeding the print media by a finer distance along the media path and providing technical benefits and advantages of detecting the edge of the RFID communication window.

Subsequent to and/or in response to step/operation 721, some example methods in accordance with some embodiments of the present disclosure proceeds to step/operation 723. In some embodiments, a processor (such as, but not limited to, the processor 305 of the printing apparatus 300 described above in connection with at least FIG. 3) causes feeding the print media based on the media feeding step parameter at step/operation 723.

As described above in connection with step/operation 721, the processor may update the media feeding step parameter based on a narrow feeding step value. At step/operation 723, the processor causes feeding the print media by a distance corresponding to the narrow feeding step value. For example, the processor may transmit one or more control instructions to one or more motors of the printing apparatus, and the one or more motors may cause the print media to travel in the print media feeding direction by a distance that corresponds to the narrow feeding step value (for example, one millimeter).

Subsequent to and/or in response to step/operation 723, some example methods in accordance with some embodiments of the present disclosure return to step/operation 713. In some embodiments, a processor (such as, but not limited to, the processor 305 of the printing apparatus 300 described above in connection with at least FIG. 3) generates an RFID communication result parameter at step/operation 713, similar to the various examples described above.

For example, subsequent to causing feeding the print media based on the media feeding step parameter at step/operation 723, the processor may cause the RFID antenna of the example printing apparatus to perform or attempt to perform one or more RFID communication operations. For example, the RFID communication result parameter may comprise an RFID communication success rate that indicates a percentage value of how successful the RFID antenna is at encoding/decoding the RFID tag subsequent to the RFID tag being fed by a distance that corresponds to a narrow feeding step value. In some embodiments, the RFID communication result parameter is associated with a print media displacement parameter that indicates a displacement of the print media subsequent to feeding the print media by a distance that corresponds to the narrow feeding step value.

In some embodiments, the processor determines that the RFID communication result parameter is not associated with an initial RFID communication success at step/operation 717. In response to determining that RFID communication result parameter is not associated with an initial RFID communication success at step/operation 717, some example methods in accordance with some embodiments of the present disclosure proceed to step/operation 725. In some embodiments, a processor (such as, but not limited to, the processor 305 of the printing apparatus 300 described above in connection with at least FIG. 3) records a data point at step/operation 725.

In some embodiments, the processor records a data point that associates the current print media displacement parameter with the RFID communication result parameter generated at step/operation 713. For example, the processor may determine the current print media displacement associated with the print media based on how far the print media has traveled from the initialized print media location, and generate the current print media displacement parameter that indicates the current print media displacement.

In some embodiments, the processor generates the data point indicating an association between the print media displacement parameter and the RFID communication result parameter, similar to generating the example data point 614 described above in connection with FIG. 6.

In some embodiments, the processor updates the RFID communication window parameter based at least in part on a print media displacement parameter that is associated with an RFID communication result parameter satisfying an RFID communication success threshold. In some embodiments, the processor updates the RFID communication window parameter to include the print media displacement parameter to indicate that the RFID antenna may successfully communicate with the RFID tag of the print media when the label/print media is located according to the print media displacement parameter.

Subsequent to and/or in response to step/operation 725, some example methods in accordance with some embodiments of the present disclosure proceed to step/operation 727. In some embodiments, a processor (such as, but not limited to, the processor 305 of the printing apparatus 300 described above in connection with at least FIG. 3) determines whether the maximum print media displacement threshold is satisfied at step/operation 727.

In the present disclosure, the term "maximum print media displacement threshold" refers to a threshold value or level of the print media displacement parameter for stop feeding the print media.

For example, the maximum print media displacement threshold may define a maximum print media displacement from the initialized print media location. In such an example, if the print media displacement parameter is more than the maximum print media displacement threshold, the processor determines that the print media has been fed for a sufficient distance such that feeding the print media should be stopped. In some embodiments, the processor ends or exits the RFID printer calibration algorithm in response to determining that the print media displacement parameter satisfies the maximum print media displacement threshold.

In some embodiments, an example maximum print media displacement threshold corresponds to a length of the label. In such an example, the processor causes feeding the print media along the media path until the displacement between a current print media location and the initialized print media location equals or is more than the length of the label. As such, the example maximum print media displacement threshold defines a stopping point for feeding the print media, providing technical advantages and benefits such as, but not limited to, accelerating RFID printer calibration.

In some embodiments, the processor determines that the maximum print media displacement threshold is satisfied at step/operation 727. In response to determining that the maximum print media displacement threshold is satisfied at step/operation 727, some example methods in accordance with some embodiments of the present disclosure proceed to step/operation 729 and ends.

In some embodiments, the processor determines that the maximum print media displacement threshold is not satisfied at step/operation 727. In response to determining that the maximum print media displacement threshold is not satisfied at step/operation 727, some example methods in accordance with some embodiments of the present disclosure proceed to step/operation 723. In some embodiments, a processor (such as, but not limited to, the processor 305 of the printing apparatus 300 described above in connection with at least FIG. 3) causes feeding the print media based on the media feeding step parameter at step/operation 723.

As described above, the processor may update the media feeding step parameter based on a narrow feeding step value. At step/operation 723, the processor causes feeding the print media by a distance corresponding to the narrow feeding step value when the RFID communication result parameter satisfies the RFID communication success threshold but is not associated with an initial RFID communication success, and the maximum print media displacement threshold is not satisfied. For example, the processor may transmit one or more control instructions to one or more motors of the printing apparatus to cause the print media to travel in the print media feeding direction by a distance that corresponds to the narrow feeding step value (for example, one millimeter).

Subsequent to and/or in response to step/operation 723, some example methods in accordance with some embodiments of the present disclosure return to step/operation 713. In some embodiments, a processor (such as, but not limited to, the processor 305 of the printing apparatus 300 described above in connection with at least FIG. 3) generates an RFID communication result parameter at step/operation 713, similar to the various examples described above.

As described above, various embodiments of the present disclosure provide technical benefits and advantages that include, but not limited to, accelerating the RFID printer calibration, reducing the amount of data points collected while retaining accurate calibration results. For example, when the RFID communication success threshold is satisfied at step/operation 715, the processor causes feeding the print media based on the media feeding step parameter that corresponds to a narrow feeding step value, therefore enabling the precise detection of the RFID communication window. As an example, when the RFID communication result parameter is associated with an initial RFID communication success, the processor causes the print media to retract by a retraction distance and updates the media feeding step parameter based on the narrow feeding step value so that the precise starting location of the RFID communication window can be detected. As another example, when the RFID communication result parameter indicates an RFID communication success subsequent to the initial RFID communication success, the processor continues causing feeding the print media based on the narrow feeding step value. In this example, because the media feeding step parameter has already been updated based on the narrow feeding step value when the RFID communication result parameter is associated with an initial RFID communication success, there is no need to update the media feeding step parameter again when the RFID communication result parameter indicates an RFID communication success subsequent to the initial RFID communication success, therefore accelerating the RFID printer calibration while retaining accurate calibration results.

In some embodiments, the processor determines that the RFID communication success threshold is not satisfied at step/operation 715. In response to determining that the RFID communication success threshold is not satisfied at step/operation 715, some example methods in accordance with some embodiments of the present disclosure proceed to step/operation 731. In some embodiments, a processor (such as, but not limited to, the processor 305 of the printing apparatus 300 described above in connection with at least FIG. 3) records a data point at step/operation 731.

For example, the processor may record a data point that associates the current print media displacement parameter with the RFID communication result parameter generated at step/operation 713. For example, the processor may determine the current print media displacement associated with the print media based on how far the print media has traveled from the initialized print media location, and generate the current print media displacement parameter that indicates the current print media displacement.

In some embodiments, the processor generates the data point indicating an association between the print media displacement parameter with the RFID communication result parameter, similar to generating the example data point 616 described above in connection with FIG. 6.

Figure 7C:
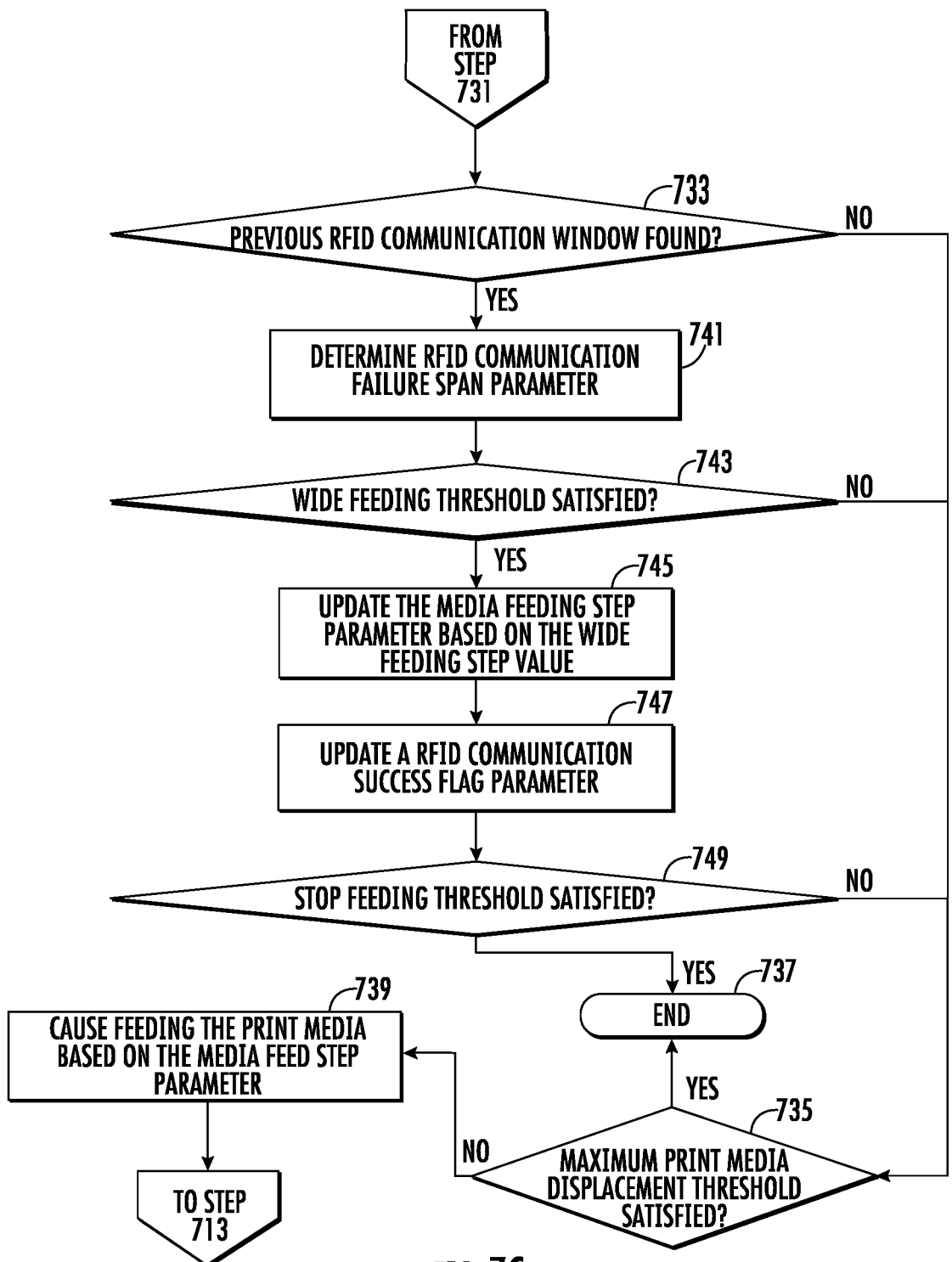
Figure 7D:
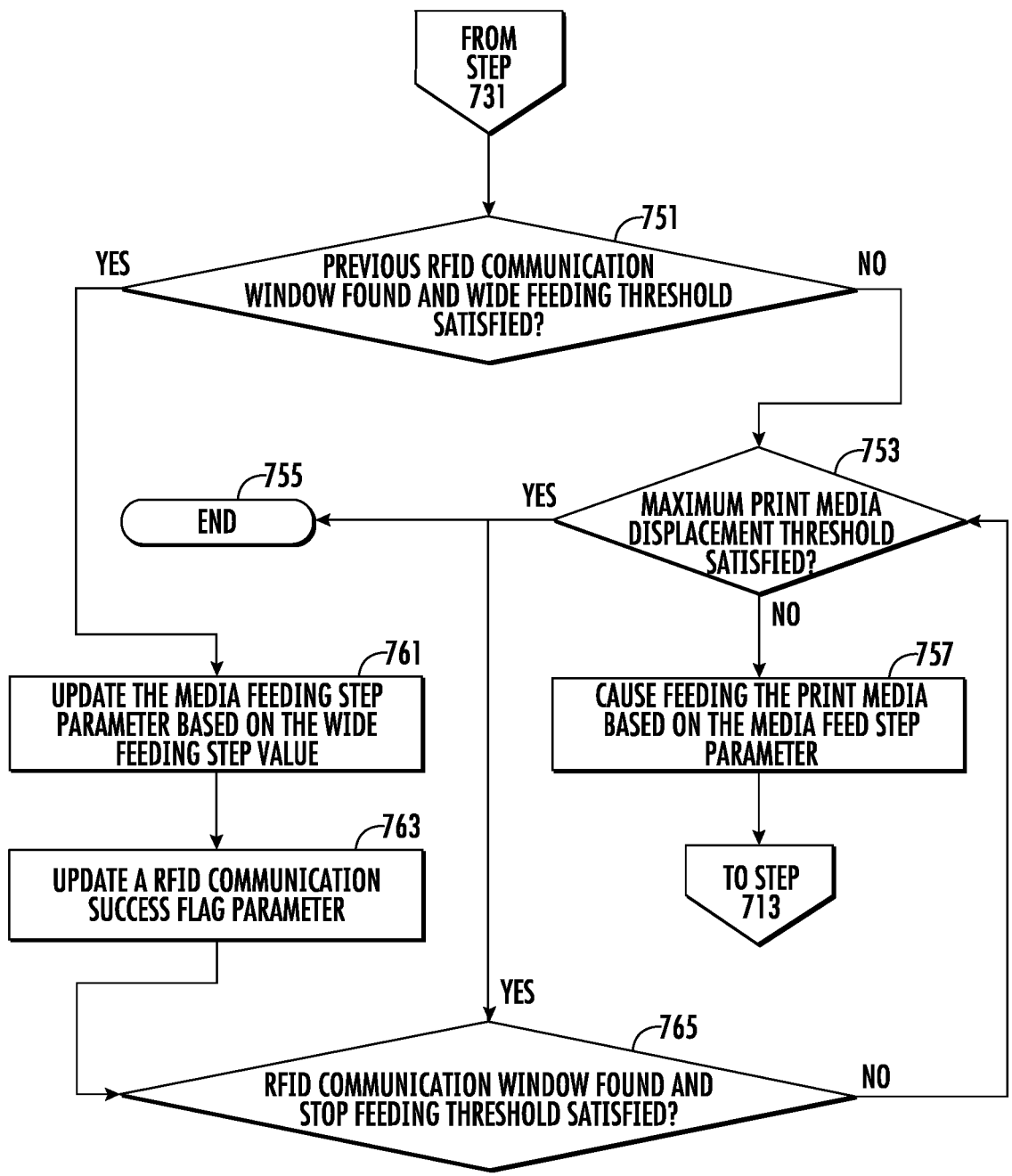

Subsequent to and/or in response to step/operation 731, some example methods in accordance with some embodiments of the present disclosure proceeds to step/operation 733 as shown in FIG. 7C. Additionally, or alternatively, some example methods in accordance with some embodiments of the present disclosure proceeds to step/operation 751 as shown in FIG. 7D.

Referring now to FIG. 7C, subsequent to and/or in response to step/operation 731 from FIG. 7B as described above, some example methods in accordance with some embodiments of the present disclosure proceed to step/operation 733. In some embodiments, a processor (such as, but not limited to, the processor 305 of the printing apparatus 300 described above in connection with at least FIG. 3) determines whether a previous RFID communication window has been found at step/operation 733.

In some embodiments, the processor may determine whether a previous RFID communication window has been found based at least in part on an RFID communication window parameter. For example, in response to determining that the RFID communication result parameter does not satisfy the RFID communication success threshold, the processor determines whether the RFID communication window parameter indicates at least one previous RFID communication window.

As an example, the processor may determine that the RFID communication window parameter does not comprise any print media displacement parameter, which indicates that none of the previously generated RFID communication result parameters (if any) satisfies the RFID communication success threshold. In such an example, the processor determines that no previous RFID communication window has been found at step/operation 733, and some example methods in accordance with some embodiments of the present disclosure proceed to step/operation 735. In some embodiments, a processor (such as, but not limited to, the processor 305 of the printing apparatus 300 described above in connection with at least FIG. 3) determines whether the maximum print media displacement threshold is satisfied at step/operation 735, similar to those described above in connection with at least step/operation 727 of FIG. 7B. If the processor determines that the maximum print media displacement threshold is satisfied, some example methods in accordance with some embodiments of the present disclosure proceed to step/operation 737 and ends. If the processor determines that the maximum print media displacement threshold is not satisfied, some example methods in accordance with some embodiments of the present disclosure proceed to step/operation 739. In some embodiments, a processor (such as, but not limited to, the processor 305 of the printing apparatus 300 described above in connection with at least FIG. 3) causes feeding the print media along the media path based on the media feeding step parameter at step/operation 739. Continuing from the example above, the processor determines that none of the previously generated RFID communication result parameter satisfies the RFID communication success threshold, and therefore the media feeding step parameter has been set based on the wide feeding step value (as described in connection with step/operation 711) and has not been updated to the narrow feeding step value. As such, the processor causes the print media to travel in the print media feeding direction by a distance according to the wide feeding step value, providing the technical benefits and advantages of accelerating RFID printer calibration. Subsequently, some example methods in accordance with some embodiments of the present disclosure return to step/operation 713, where a processor (such as, but not limited to, the processor 305 of the printing apparatus 300 described above in connection with at least FIG. 3) generates another RFID communication result parameter, similar to those described above in connection with at least generating the data point 604 described above in connection with at least FIG. 6.

As another example, the processor may determine that the RFID communication window parameter indicates one or more print media displacement parameters that are associated with one or more RFID communication result parameters satisfying the RFID communication success threshold. In such an example, the processor may determine a print media displacement span associated with the one or more print media displacement parameters, and compare the print media displacement span with the RFID communication window threshold.

For example, the processor may determine that the print media displacement span associated with the RFID communication window parameter does not satisfy the RFID communication window threshold. This may occur, for example, when the print media has been retracted to the current print media location (for example, similar to those described above in connection with at least step/operation 719). Continuing in this example, some example methods in accordance with some embodiments of the present disclosure proceed to step/operation 735. In some embodiments, a processor (such as, but not limited to, the processor 305 of the printing apparatus 300 described above in connection with at least FIG. 3) determines whether the maximum print media displacement threshold is satisfied at step/operation 735, similar to those described above in connection with at least step/operation 727 of FIG. 7B. If the processor determines that the maximum print media displacement threshold is satisfied, some example methods in accordance with some embodiments of the present disclosure proceed to step/operation 737 and ends. If the processor determines that the maximum print media displacement threshold is not satisfied, some example methods in accordance with some embodiments of the present disclosure proceed to step/ operation 739. In some embodiments, a processor (such as, but not limited to, the processor 305 of the printing apparatus 300 described above in connection with at least FIG. 3) causes feeding the print media along the media path based on the media feeding step parameter at step/operation 739. Continuing from the above example, because one or more RFID communication result parameters satisfy the RFID communication success threshold as indicated by the RFID communication window parameter, the media feeding step parameter has been updated to the narrow feeding step value (similar to those described above at step/operation 721). As such, the processor causes the print media to travel in the print media feeding direction by a distance according to the narrow feeding step value, providing the technical benefits and advantages of accurate RFID printer calibration. Subsequently, some example methods in accordance with some embodiments of the present disclosure return to step/operation 713, where a processor (such as, but not limited to, the processor 305 of the printing apparatus 300 described above in connection with at least FIG. 3) generates another RFID communication result parameter, for example, similar to generating the data point 614 described above in connection with at least FIG. 6.

As another example, the processor may determine that the print media displacement span associated with the RFID communication window parameter satisfies the RFID communication window threshold. In such an example, the processor may determine that a previous RFID communication window has been found at step/operation 733.

As described above, a label may be associated with only one RFID communication window. In response to determining that the previous RFID communication window has been found at step/operation 733, some example methods in accordance with some embodiments of the present disclosure proceed to step/operation 741. In some embodiments, a processor (such as, but not limited to, the processor 305 of the printing apparatus 300 described above in connection with at least FIG. 3) determines an RFID communication failure span parameter at step/operation 741. Similar to those described above in connection with at least FIG. 6, the processor may determine the RFID communication failure span parameter based at least in part on the current print media displacement parameter. For example, the processor may traverse previously collected data points to determine a starting data point of the continuous RFID communication failure, and determine the RFID communication failure span parameter based at least in part on subtracting the print media displacement parameter associated with the starting data point from the current print media displacement parameter.

Subsequent to and/or in response to step/operation 741, some example methods in accordance with some embodiments of the present disclosure proceed to step/operation 743. In some embodiments, a processor (such as, but not limited to, the processor 305 of the printing apparatus 300 described above in connection with at least FIG. 3) determines whether the wide feeding threshold is satisfied at step/operation 743. For example, the processor may compare the RFID communication failure span parameter determined at step/operation 741 with the wide feeding threshold. If the processor determines that the RFID communication failure span parameter is less than the wide feeding threshold, the processor determines that the wide feeding threshold is not satisfied. If the processor determines that the RFID communication failure span parameter is more than the wide feeding threshold, the processor determines that the wide feeding threshold is satisfied.

In some embodiments, the processor determines that the wide feeding threshold is not satisfied at step/operation 743. In response to determining that the wide step feeding threshold is not satisfied at step/operation 743, some example methods in accordance with some embodiments of the present disclosure proceed to step/operation 735. In some embodiments, a processor (such as, but not limited to, the processor 305 of the printing apparatus 300 described above in connection with at least FIG. 3) determines whether a maximum print media displacement threshold is satisfied at step/operation 735, similar to various examples described above.

In some embodiments, the processor determines that the maximum print media displacement threshold is satisfied at step/operation 735. In response to determining that the maximum print media displacement threshold is satisfied at step/operation 735, some example methods in accordance with some embodiments of the present disclosure proceed to step/operation 737 and ends.

In some embodiments, the processor determines that the maximum print media displacement threshold is not satisfied at step/operation 735. In response to determining that the maximum print media displacement threshold is not satisfied at step/operation 735, some example methods in accordance with some embodiments of the present disclosure proceed to step/operation 739. In some embodiments, a processor (such as, but not limited to, the processor 305 of the printing apparatus 300 described above in connection with at least FIG. 3) causes feeding the print media based on the media feeding step parameter at step/operation 739.

For example, the processor may previously determine that a previous RFID communication window has been found at step/operation 733, which indicates that at least one previously generated RFID communication result parameter satisfies the RFID communication success threshold and that the media feeding step parameter has been updated to the narrow feeding step value (for example, in connection with step/operation 721 described above). As such, the processor causes the print media to travel in the print media feeding direction by a distance according to the narrow feeding step value, providing technical benefits and advantages of accurate RFID printer calibration. Subsequently, some example methods in accordance with some embodiments of the present disclosure return to step/operation 713, where a processor (such as, but not limited to, the processor 305 of the printing apparatus 300 described above in connection with at least FIG. 3) generates another RFID communication result parameter, for example, similar to generating the data point 616 described above in connection with at least FIG. 6.

In some embodiments, the processor determines that the wide step feeding threshold is satisfied at step/operation 743. In response to determining that the wide step feeding threshold is satisfied at step/operation 743, some example methods in accordance with some embodiments of the present disclosure proceed to step/operation 745. In some embodiments, a processor (such as, but not limited to, the processor 305 of the printing apparatus 300 described above in connection with at least FIG. 3) updates the media feeding step parameter based on the wide feeding step value at step/operation 745.

Similar to those described above, the wide feeding threshold may define a minimum print media displacement span. In such an example, if the print media displacement span associated with an RFID communication failure span parameter is more than the wide feeding threshold, the processor determines that the RFID communication failure has prolonged for a sufficient distance such that the media feeding step parameter should be updated from the narrow feeding step value to the wide feeding step value to accelerate RFID printer calibration. In some embodiments, the processor increases the feeding step value of the media feeding step parameter when the RFID communication failure span parameter satisfies the wide feeding threshold.

Subsequent to and/or in response to step/operation 745, some example methods in accordance with some embodiments of the present disclosure proceeds to step/operation 747. In some embodiments, a processor (such as, but not limited to, the processor 305 of the printing apparatus 300 described above in connection with at least FIG. 3) updates an RFID communication success flag parameter at step/operation 747.

In some embodiments, the processor updates the RFID communication success flag parameter to indicate no previous RFID communication success in response to determining that the RFID communication failure span parameter satisfies the wide feeding threshold. For example, when the processor determines that the RFID communication failure span parameter satisfies the wide feeding threshold, the processor determines that the print media has been fed by a sufficient distance away from any print media location where any previous RFID communication window is detected. In such an example, any subsequent RFID communication success is likely associated with a new RFID communication window. As such, the processor resets the RFID communication success flag parameter so that the RFID printer can be calibrated for the next RFID communication window (if any).

Subsequent to and/or in response to step/operation 747, some example methods in accordance with some embodiments of the present disclosure proceeds to step/operation 749. In some embodiments, a processor (such as, but not limited to, the processor 305 of the printing apparatus 300 described above in connection with at least FIG. 3) determines whether a stop feeding threshold is satisfied at step/operation 749.

Similar to those described above in connection with at least FIG. 6, the stop feeding threshold may define a minimum print media displacement span. In such an example, if the print media displacement span associated with an RFID communication failure span parameter is more than the stop feeding threshold, the processor determines that the RFID communication failure has prolonged for a sufficient distance such that feeding of the print media should be stopped because there is likely no more RFID communication window. In some embodiments, the processor ends or exits the RFID printer calibration algorithm in response to determining that the RFID communication failure span parameter satisfies the stop feeding threshold.

In some embodiments, the processor determines that the stop feeding threshold is satisfied is satisfied at step/operation 749. In response to determining that the stop feeding threshold is satisfied is satisfied at step/operation 749, some example methods in accordance with some embodiments of the present disclosure proceed to step/operation 737 and ends.

In some embodiments, the processor determines that the stop feeding threshold is not satisfied at step/operation 749. In response to determining that the cease feeding threshold is not satisfied is satisfied at step/operation 749, some example methods in accordance with some embodiments of the present disclosure proceed to step/operation 735. In some embodiments, a processor (such as, but not limited to, the processor 305 of the printing apparatus 300 described above in connection with at least FIG. 3) determines whether a maximum print media displacement threshold is satisfied at step/operation 735, similar to the various examples described above.

In some embodiments, the processor determines that the maximum print media displacement threshold is satisfied at step/operation 735. In response to determining that the maximum print media displacement threshold is satisfied at step/operation 735, some example methods in accordance with some embodiments of the present disclosure proceed to step/operation 737 and ends.

In some embodiments, the processor determines that the maximum print media displacement threshold is not satisfied at step/operation 735. In response to determining that the maximum print media displacement threshold is not satisfied at step/operation 735, some example methods in accordance with some embodiments of the present disclosure proceed to step/operation 739. In some embodiments, a processor (such as, but not limited to, the processor 305 of the printing apparatus 300 described above in connection with at least FIG. 3) causes feeding the print media based on the media feeding step parameter at step/operation 739. For example, the processor may set the media feeding step parameter based on the wide feeding step value as described in connection with step/operation 745. As such, the processor causes the print media to travel in the print media feeding direction by a distance according to the wide feeding step value, providing the technical benefits and advantages of accelerating RFID printer calibration. Subsequently, some example methods in accordance with some embodiments of the present disclosure return to step/operation 713, where a processor (such as, but not limited to, the processor 305 of the printing apparatus 300 described above in connection with at least FIG. 3) generates another RFID communication result parameter, for example, similar to generating the data point 620 described above in connection with at least FIG. 6.

Referring now to FIG. 7D, subsequent to and/or in response to step/operation 731 from FIG. 7B described above, some example methods in accordance with some embodiments of the present disclosure proceed to step/operation 751. In some embodiments, a processor (such as, but not limited to, the processor 305 of the printing apparatus 300 described above in connection with at least FIG. 3) determines whether a previous RFID communication window is found and whether the wide feeding threshold is satisfied at step/operation 751.

In some embodiments, the processor determines whether a previous RFID communication window is found similar to those described above in connection with at least step/operation 733 of FIG. 7C. In some embodiments, the processor determines whether the wide feeding threshold is satisfied similar to those described above in connection with at least step/operation 743 of FIG. 7C.

In some embodiments, the processor determines that the RFID communication window is not found and/or the wide feeding threshold is not satisfied at step/operation 751. In response to determining that the RFID communication window is not found and/or the wide feeding threshold is not satisfied at step/operation 751, some example methods in accordance with some embodiments of the present disclosure proceed to step/operation 753. In some embodiments, a processor (such as, but not limited to, the processor 305 of the printing apparatus 300 described above in connection with at least FIG. 3) determines whether the maximum print media displacement threshold is satisfied at step/operation 753, similar to those described above in connection with at least step/operation 727 of FIG. 7B.

In some embodiments, the processor determines that the maximum print media displacement threshold is satisfied at step/operation 753. In response to determining that the maximum print media displacement threshold is satisfied at step/operation 753, some example methods in accordance with some embodiments of the present disclosure proceed to step/operation 755 and ends.

In some embodiments, the processor determines that the maximum print media displacement threshold is not satisfied at step/operation 753. In response to determining that the maximum print media displacement threshold is not satisfied at step/operation 753, some example methods in accordance with some embodiments of the present disclosure proceed to step/operation 757. In some embodiments, a processor (such as, but not limited to, the processor 305 of the printing apparatus 300 described above in connection with at least FIG. 3) causes feeding the print media based on the media feed step parameter at step/operation 757.

For example, if the processor determines that no previous RFID communication window has been found at step/operation 751, the media feeding step parameter is set based on the wide feeding step value (similar to those described in connection with step/operation 711), and therefore the processor causes feeding the print media by a distance according to the wide feeding step value.

As another example, if the processor determines that a previous RFID communication window has been found, the media feeding step parameter has been set based on the narrow feeding step value (similar to those described in connection with step/operation 721). Continuing in this example, if the processor determines that the wide feeding threshold is not satisfied at step/operation 751, the media feeding step parameter has not been updated to the wide feeding step value. Therefore, the processor causes feeding the print media by a distance according to the narrow feeding step value.

Subsequent to and/or in response to step/operation 757, some example methods in accordance with some embodiments of the present disclosure return to step/operation 713 as shown in FIG. 7B. In some embodiments, a processor (such as, but not limited to, the processor 305 of the printing apparatus 300 described above in connection with at least FIG. 3) generates another RFID communication result parameter at step/operation 713, similar to the various examples described above.

In some embodiments, the processor determines that the RFID communication window is found and the wide feeding threshold is satisfied at step/operation 751. In response to determining that the RFID communication window is found and the wide feeding threshold is satisfied at step/operation 751, some example methods in accordance with some embodiments of the present disclosure proceed to step/operation 761. In some embodiments, a processor (such as, but not limited to, the processor 305 of the printing apparatus 300 described above in connection with at least FIG. 3) updates the media feeding step parameter based on the wide feeding step value at step/operation 761, similar to those described above in connection with at least step/operation 745 of FIG. 7C.

Subsequent to and/or in response to step/operation 761, some example methods in accordance with some embodiments of the present disclosure proceed to step/operation 763. In some embodiments, a processor (such as, but not limited to, the processor 305 of the printing apparatus 300 described above in connection with at least FIG. 3) updates an RFID communication success flag parameter at step/operation 763 to indicate no previous RFID communication success, similar to those described above in connection with at least step/operation 747 of FIG. 7C.

Subsequent to and/or in response to step/operation 763, some example methods in accordance with some embodiments of the present disclosure proceed to step/operation 765. In some embodiments, a processor (such as, but not limited to, the processor 305 of the printing apparatus 300 described above in connection with at least FIG. 3) determines whether the RFID communication window is found and the stop feeding threshold is satisfied.

In some embodiments, the processor determines whether a previous RFID communication window is found similar to those described above in connection with at least step/operation 733 of FIG. 7C. In some embodiments, the processor determines whether the stop feeding threshold is satisfied similar to those described above in connection with at least step/operation 749 of FIG. 7C.

In some embodiments, the processor determines that the RFID communication window is found and the stop feeding threshold is satisfied at step/operation 765. In response to determining that the RFID communication window is found and the stop feeding threshold is satisfied at step/operation 765, some example methods in accordance with some embodiments of the present disclosure proceed to step/operation 755 and ends.

In some embodiments, the processor determines that the RFID communication window is not found and/or the stop feeding threshold is not satisfied at step/operation 765. In response to determining that the RFID communication window is not found and/or the stop feeding threshold is not satisfied at step/operation 765, some example methods in accordance with some embodiments of the present disclosure proceed to step/operation 753. In some embodiments, a processor (such as, but not limited to, the processor 305 of the printing apparatus 300 described above in connection with at least FIG. 3) determines whether the maximum print media displacement threshold is satisfied at step/operation 753, similar to those described above in connection with at least step/operation 727.

In some embodiments, the processor determines that the maximum print media displacement threshold is satisfied at step/operation 753. In response to determining that the maximum print media displacement threshold is satisfied at step/operation 753, some example methods in accordance with some embodiments of the present disclosure proceed to step/operation 755 and ends.

In some embodiments, the processor determines that the maximum print media displacement threshold is not satisfied at step/operation 753. In response to determining that the maximum print media displacement threshold is not satisfied at step/operation 753, some example methods in accordance with some embodiments of the present disclosure proceed to step/operation 757. In some embodiments, a processor (such as, but not limited to, the processor 305 of the printing apparatus 300 described above in connection with at least FIG. 3) causes feeding the print media based on the media feed step parameter at step/operation 757.

For example, if the processor determines that no previous RFID communication window has been found at step/operation 765, the media feeding step parameter has been set based on the wide feeding step value at step/operation 711, and therefore the processor causes feeding the print media by a distance according to the wide feeding step value.

As another example, if the processor determines that a previous RFID communication window has been found, and that the wide feeding threshold is satisfied at step/operation 751 but the stop feeding threshold is not satisfied at step/operation 765, the media feeding step parameter has been updated to the wide feeding step value at step/operation 761, and therefore the processor causes feeding the print media by a distance according to the wide feeding step value.

Subsequent to and/or in response to step/operation 757, some example methods in accordance with some embodiments of the present disclosure return to step/operation 713 as shown in FIG. 7B. In some embodiments, a processor (such as, but not limited to, the processor 305 of the printing apparatus 300 described above in connection with at least FIG. 3) generates another RFID communication result parameter at step/operation 713, similar to the various examples described above.

As described above, the present disclosure provides various examples in accordance with embodiments of the present disclosure. It is noted that the scope of the present disclosure is not limited to the following examples.

Example 1: an apparatus comprising at least one processor configured to: set a media feeding step parameter based on a wide feeding step value; determine whether an RFID communication result parameter satisfies an RFID communication success threshold, wherein the RFID communication result parameter is associated with a print media displacement parameter that is related to print media; in response to determining that the RFID communication result parameter satisfies the RFID communication success threshold, determine whether the RFID communication result parameter is associated with an initial RFID communication success; and in response to determining that the RFID communication result parameter is associated with the initial RFID communication success: cause retracting the print media along a media path; and update the media feeding step parameter based on a narrow feeding step value.

Example 2: the apparatus of any of the previous examples, wherein the at least one processor is configured to determine whether the RFID communication result parameter is associated with the initial RFID communication success based on an RFID communication success flag parameter.

Example 3: the apparatus of any of the previous examples, wherein the at least one processor is configured to: in response to determining that the RFID communication result parameter is not associated with the initial RFID communication success, update an RFID communication window parameter based at least in part on the print media displacement parameter.

Example 4: the apparatus of any of the previous examples, wherein the at least one processor is configured to: determine whether the print media displacement parameter satisfies a maximum print media displacement threshold; and in response to determining that the print media displacement parameter does not satisfy the maximum print media displacement threshold, cause feeding the print media along the media path based on the media feeding step parameter.

Example 5: the apparatus of any of the previous examples, wherein the at least one processor is configured to: in response to determining that the RFID communication result parameter does not satisfy the RFID communication success threshold, determine whether an RFID communication window parameter indicates at least one previous RFID communication window.

Example 6: the apparatus of any of the previous examples, wherein the at least one processor is configured to: in response to determining that the RFID communication window parameter does not indicate the at least one previous RFID communication window, determine whether the print media displacement parameter satisfies a maximum print media displacement threshold; and in response to determining that the print media displacement parameter does not satisfy the maximum print media displacement threshold, cause feeding the print media along the media path based on the media feeding step parameter.

Example 7: the apparatus of any of the previous examples, wherein the at least one processor is configured to: in response to determining that the RFID communication window parameter indicates the at least one previous RFID communication window, determine an RFID communication failure span parameter based at least in part on the print media displacement parameter and the RFID communication window parameter; and determine whether the RFID communication failure span parameter satisfies a wide feeding threshold.

Example 8: the apparatus of any of the previous examples, wherein the at least one processor is configured to: in response to determining that the RFID communication failure span parameter does not satisfy the wide feeding threshold, determine whether the print media displacement parameter satisfies a maximum print media displacement threshold; and in response to determining that the print media displacement parameter does not satisfy the maximum print media displacement threshold, cause feeding the print media along the media path based on the media feeding step parameter.

Example 9: the apparatus of any of the previous examples, wherein the at least one processor is configured to: in response to determining that the RFID communication failure span parameter satisfies the wide feeding threshold: update the media feeding step parameter based on the wide feeding step value; and update an RFID communication success flag parameter to indicate no previous RFID communication success.

Example 10: the apparatus of any of the previous examples, wherein the at least one processor is configured to: determine whether the RFID communication failure span parameter satisfies a stop feeding threshold.

Example 11: a computer-implemented method comprising: setting a media feeding step parameter based on a wide feeding step value; determining whether an RFID communication result parameter satisfies an RFID communication success threshold, wherein the RFID communication result parameter is associated with a print media displacement parameter that is related to print media; in response to determining that the RFID communication result parameter satisfies the RFID communication success threshold, determining whether the RFID communication result parameter is associated with an initial RFID communication success; and in response to determining that the RFID communication result parameter is associated with the initial RFID communication success: causing retracting the print media along a media path; and updating the media feeding step parameter based on a narrow feeding step value.

Example 12: the computer-implemented method of any of the previous examples, further comprising determining whether the RFID communication result parameter is associated with the initial RFID communication success based on an RFID communication success flag parameter.

Example 13: the computer-implemented method of any of the previous examples, further comprising, in response to determining that the RFID communication result parameter is not associated with the initial RFID communication success, updating an RFID communication window parameter based at least in part on the print media displacement parameter.

Example 14: the computer-implemented method of any of the previous examples, further comprising determining whether the print media displacement parameter satisfies a maximum print media displacement threshold; and in response to determining that the print media displacement parameter does not satisfy the maximum print media displacement threshold, causing feeding the print media along the media path based on the media feeding step parameter.

Example 15: the computer-implemented method of any of the previous examples, further comprising, in response to determining that the RFID communication result parameter does not satisfy the RFID communication success threshold, determining whether an RFID communication window parameter indicates at least one previous RFID communication window.

Example 16: the computer-implemented method of any of the previous examples, further comprising, in response to determining that the RFID communication window parameter does not indicate the at least one previous RFID communication window, determining whether the print media displacement parameter satisfies a maximum print media displacement threshold; and in response to determining that the print media displacement parameter does not satisfy the maximum print media displacement threshold, causing feeding the print media along the media path based on the media feeding step parameter.

Example 17: the computer-implemented method of any of the previous examples, further comprising, in response to determining that the RFID communication window parameter indicates the at least one previous RFID communication window, determining an RFID communication failure span parameter based at least in part on the print media displacement parameter and the RFID communication window parameter; and determining whether the RFID communication failure span parameter satisfies a wide feeding threshold.

Example 18: the computer-implemented method of any of the previous examples, further comprising, in response to determining that the RFID communication failure span parameter does not satisfy the wide feeding threshold, determining whether the print media displacement parameter satisfies a maximum print media displacement threshold; and in response to determining that the print media displacement parameter does not satisfy the maximum print media displacement threshold, causing feeding the print media along the media path based on the media feeding step parameter.

Example 19: the computer-implemented method of any of the previous examples, further comprising: in response to determining that the RFID communication failure span parameter satisfies the wide feeding threshold: updating the media feeding step parameter based on the wide feeding step value; and updating an RFID communication success flag parameter to indicate no previous RFID communication success.

Example 20: the computer-implemented method of any of the previous examples, further comprising determining whether the RFID communication failure span parameter satisfies a stop feeding threshold.

Example 21: a computer program product comprising at least one non-transitory computer-readable storage medium having computer-readable program code portions stored therein, the computer-readable program code portions comprising an executable portion configured to: set a media feeding step parameter based on a wide feeding step value; determine whether an RFID communication result parameter satisfies an RFID communication success threshold, wherein the RFID communication result parameter is associated with a print media displacement parameter that is related to print media; in response to determining that the RFID communication result parameter satisfies the RFID communication success threshold, determine whether the RFID communication result parameter is associated with an initial RFID communication success; and in response to determining that the RFID communication result parameter is associated with the initial RFID communication success: cause retracting the print media along a media path; and update the media feeding step parameter based on a narrow feeding step value.

Example 22: the computer program product of any of the previous examples, wherein the computer-readable program code portions comprise the executable portion configured to determine whether the RFID communication result parameter is associated with the initial RFID communication success based on an RFID communication success flag parameter.

Example 23: the computer program product of any of the previous examples, wherein the computer-readable program code portions comprise the executable portion configured to: in response to determining that the RFID communication result parameter is not associated with the initial RFID communication success, update an RFID communication window parameter based at least in part on the print media displacement parameter.

Example 24: the computer program product of any of the previous examples, wherein the computer-readable program code portions comprise the executable portion configured to: determine whether the print media displacement parameter satisfies a maximum print media displacement threshold; and in response to determining that the print media displacement parameter does not satisfy the maximum print media displacement threshold, cause feeding the print media along the media path based on the media feeding step parameter.

Example 25: the computer program product of any of the previous examples, wherein the computer-readable program code portions comprise the executable portion configured to: in response to determining that the RFID communication result parameter does not satisfy the RFID communication success threshold, determine whether an RFID communication window parameter indicates at least one previous RFID communication window.

Example 26: the computer program product of any of the previous examples, wherein the computer-readable program code portions comprise the executable portion configured to: in response to determining that the RFID communication window parameter does not indicate the at least one previous RFID communication window, determine whether the print media displacement parameter satisfies a maximum print media displacement threshold; and in response to determining that the print media displacement parameter does not satisfy the maximum print media displacement threshold, cause feeding the print media along the media path based on the media feeding step parameter.

Example 27: the computer program product of any of the previous examples, wherein the computer-readable program code portions comprise the executable portion configured to: in response to determining that the RFID communication window parameter indicates the at least one previous RFID communication window, determine an RFID communication failure span parameter based at least in part on the print media displacement parameter and the RFID communication window parameter; and determine whether the RFID communication failure span parameter satisfies a wide feeding threshold.

Example 28: the computer program product of any of the previous examples, wherein the computer-readable program code portions comprise the executable portion configured to: in response to determining that the RFID communication failure span parameter does not satisfy the wide feeding threshold, determine whether the print media displacement parameter satisfies a maximum print media displacement threshold; and in response to determining that the print media displacement parameter does not satisfy the maximum print media displacement threshold, cause feeding the print media along the media path based on the media feeding step parameter.

Example 29: the computer program product of any of the previous examples, wherein the computer-readable program code portions comprise the executable portion configured to: in response to determining that the RFID communication failure span parameter satisfies the wide feeding threshold: update the media feeding step parameter based on the wide feeding step value; and update an RFID communication success flag parameter to indicate no previous RFID communication success.

Example 30: the computer program product of any of the previous examples, wherein the computer-readable program code portions comprise the executable portion configured to: determine whether the RFID communication failure span parameter satisfies a stop feeding threshold.

The foregoing detailed description has set forth various embodiments of the devices and/or processes via the use of block diagrams, flow charts, schematics, exemplary, and examples. Insofar as such block diagrams, flow charts, schematics, and examples contain one or more functions and/or operations, each function and/or operation within such block diagrams, flowcharts, schematics, or examples can be implemented, individually and/or collectively, by a wide range of hardware thereof.

In one embodiment, examples of the present disclosure may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more processing circuitries (e.g., micro-processing circuitries), as one or more programs running on one or more processors (e.g., microprocessors), as firmware, or as virtually any combination thereof.

In addition, those skilled in the art will appreciate that example mechanisms disclosed herein may be capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The invention claimed is:

1. An apparatus comprising at least one processor configured to:
    initiate radio frequency identification (RFID) printer calibration to generate an initial RFID communication result parameter and set a media feeding step parameter based on a wide feeding step value;
    determine, during the RFID printer calibration, whether a RFID communication result parameter satisfies an RFID communication success threshold, wherein the RFID communication result parameter is associated with a print media displacement parameter that is related to print media;
    in response to determining that the RFID communication result parameter satisfies the RFID communication success threshold, determine whether the RFID communication result parameter is associated with an initial RFID communication success; and
    in response to determining that the RFID communication result parameter is associated with the initial RFID communication success:
        cause, during the RFID printer calibration, retracting the print media along a media path; and
        update, during the RFID printer calibration, the media feeding step parameter based on a narrow feeding step value.

2. The apparatus of claim 1, wherein the at least one processor is configured to determine whether the RFID communication result parameter is associated with the initial RFID communication success based on an RFID communication success flag parameter.

3. The apparatus of claim 1, wherein the at least one processor is configured to:
    in response to determining that the RFID communication result parameter is not associated with the initial RFID communication success, update an RFID communication window parameter based at least in part on the print media displacement parameter.

4. The apparatus of claim 3, wherein the at least one processor is configured to:
    determine whether the print media displacement parameter satisfies a maximum print media displacement threshold; and
    in response to determining that the print media displacement parameter does not satisfy the maximum print media displacement threshold, cause feeding the print media along the media path based on the media feeding step parameter.

5. The apparatus of claim 1, wherein the at least one processor is configured to:
    in response to determining that the RFID communication result parameter does not satisfy the RFID communication success threshold, determine whether an RFID communication window parameter indicates at least one previous RFID communication window.

6. The apparatus of claim 5, wherein the at least one processor is configured to:
    in response to determining that the RFID communication window parameter does not indicate the at least one previous RFID communication window, determine whether the print media displacement parameter satisfies a maximum print media displacement threshold; and
    in response to determining that the print media displacement parameter does not satisfy the maximum print media displacement threshold, cause feeding the print media along the media path based on the media feeding step parameter.

7. The apparatus of claim 5, wherein the at least one processor is configured to:
    in response to determining that the RFID communication window parameter indicates the at least one previous RFID communication window, determine an RFID communication failure span parameter based at least in part on the print media displacement parameter; and
    determine whether the RFID communication failure span parameter satisfies a wide feeding threshold.

8. A computer-implemented method comprising:
  initiating radio frequency identification (RFID) printer calibration to generate an initial RFID communication result parameter and set a media feeding step parameter based on a wide feeding step value;
  determining, during the RFID printer calibration, whether a (RFID communication result parameter satisfies an RFID communication success threshold, wherein the RFID communication result parameter is associated with a print media displacement parameter that is related to print media;
  in response to determining that the RFID communication result parameter satisfies the RFID communication success threshold, determining whether the RFID communication result parameter is associated with an initial RFID communication success; and
  in response to determining that the RFID communication result parameter is associated with the initial RFID communication success:
    causing, during the RFID printer calibration, retracting the print media along a media path; and
    updating, during the RFID printer calibration, the media feeding step parameter based on a narrow feeding step value.

9. The computer-implemented method of claim 8, further comprising determining whether the RFID communication result parameter is associated with the initial RFID communication success based on an RFID communication success flag parameter.

10. The computer-implemented method of claim 8, further comprising:
  in response to determining that the RFID communication result parameter is not associated with the initial RFID communication success, updating an RFID communication window parameter based at least in part on the print media displacement parameter.

11. The computer-implemented method of claim 10, further comprising:
  determining whether the print media displacement parameter satisfies a maximum print media displacement threshold; and
  in response to determining that the print media displacement parameter does not satisfy the maximum print media displacement threshold, causing feeding the print media along the media path based on the media feeding step parameter.

12. The computer-implemented method of claim 8, further comprising:
  in response to determining that the RFID communication result parameter does not satisfy the RFID communication success threshold, determining whether an RFID communication window parameter indicates at least one previous RFID communication window.

13. The computer-implemented method of claim 12, further comprising:
  in response to determining that the RFID communication window parameter does not indicate the at least one previous RFID communication window, determining whether the print media displacement parameter satisfies a maximum print media displacement threshold; and
  in response to determining that the print media displacement parameter does not satisfy the maximum print media displacement threshold, causing feeding the print media along the media path based on the media feeding step parameter.

14. The computer-implemented method of claim 12, further comprising:
  in response to determining that the RFID communication window parameter indicates the at least one previous RFID communication window, determining an RFID communication failure span parameter based at least in part on the print media displacement parameter; and
  determining whether the RFID communication failure span parameter satisfies a wide feeding threshold.

15. A computer program product comprises at least one non-transitory computer-readable storage medium having computer-readable program code portions stored therein, the computer-readable program code portions comprising an executable portion configured to:
  initiate radio frequency identification (RFID) printer calibration to generate an initial RFID communication result parameter and set a media feeding step parameter based on a wide feeding step value;
  determine whether a RFID communication result parameter satisfies an RFID communication success threshold, wherein the RFID communication result parameter is associated with a print media displacement parameter that is related to print media;
  in response to determining that the RFID communication result parameter satisfies the RFID communication success threshold, determine whether the RFID communication result parameter is associated with an initial RFID communication success; and
  in response to determining that the RFID communication result parameter is associated with the initial RFID communication success:
    cause, during the RFID printer calibration, retracting the print media along a media path; and
    update, during the RFID printer calibration, the media feeding step parameter based on a narrow feeding step value.

16. The computer program product of claim 15, wherein the computer-readable program code portions comprise the executable portion configured to determine whether the RFID communication result parameter is associated with the initial RFID communication success based on an RFID communication success flag parameter.

17. The computer program product of claim 15, wherein the computer-readable program code portions comprise the executable portion configured to:
  in response to determining that the RFID communication result parameter is not associated with the initial RFID communication success, update an RFID communication window parameter based at least in part on the print media displacement parameter.

18. The computer program product of claim 17, wherein the computer-readable program code portions comprise the executable portion configured to:
  determine whether the print media displacement parameter satisfies a maximum print media displacement threshold; and
  in response to determining that the print media displacement parameter does not satisfy the maximum print media displacement threshold, cause feeding the print media along the media path based on the media feeding step parameter.

19. The computer program product of claim 15, wherein the computer-readable program code portions comprise the executable portion configured to:
  in response to determining that the RFID communication result parameter does not satisfy the RFID communication success threshold, determine whether an RFID communication window parameter indicates at least one previous RFID communication window.

20. The computer program product of claim 19, wherein the computer-readable program code portions comprise the executable portion configured to:
- in response to determining that the RFID communication window parameter does not indicate the at least one previous RFID communication window, determine whether the print media displacement parameter satisfies a maximum print media displacement threshold; and
- in response to determining that the print media displacement parameter does not satisfy the maximum print media displacement threshold, cause feeding the print media along the media path based on the media feeding step parameter.

* * * * *